(12) United States Patent
Lutz et al.

(10) Patent No.: US 8,797,278 B1
(45) Date of Patent: Aug. 5, 2014

(54) AIRCRAFT CHARTING SYSTEM WITH MULTI-TOUCH INTERACTION GESTURES FOR MANAGING A MAP OF AN AIRPORT

(75) Inventors: Andre Lutz, Darmstadt (DE); Cindy Dorfmann, Darmstadt (DE); Jason W. Clark, Evergreen, CO (US)

(73) Assignee: The Boeing Company, Chicago, IL (US)

( * ) Notice: Subject to any disclaimer, the term of this patent is extended or adjusted under 35 U.S.C. 154(b) by 797 days.

(21) Appl. No.: 12/707,850

(22) Filed: Feb. 18, 2010

(51) Int. Cl.
*G06F 3/041* (2006.01)

(52) U.S. Cl.
USPC ........... 345/173; 345/156; 345/174; 345/175; 178/18.01; 178/18.03; 178/19.01; 178/20.01; 701/11; 701/14; 701/117; 701/211

(58) Field of Classification Search
CPC .... G01C 21/00; G01C 23/005; G08G 5/0021; G08G 5/0039; G08G 5/025; G08G 5/065
USPC ............ 345/156, 173–184; 178/18.01–18.09, 178/19.01–19.04, 20.01; 701/11, 14, 117, 701/211
See application file for complete search history.

(56) References Cited

U.S. PATENT DOCUMENTS

| | | | |
|---|---|---|---|
| 5,715,163 A | 2/1998 | Bang et al. | |
| 6,112,141 A | 8/2000 | Briffe et al. | |
| 6,687,612 B2 | 2/2004 | Cherveny | |
| 7,979,197 B2 | 7/2011 | Finn et al. | |
| 2006/0173615 A1 | 8/2006 | Pinkus et al. | |
| 2008/0005703 A1* | 1/2008 | Radivojevic et al. | 715/863 |
| 2009/0150013 A1* | 6/2009 | Finn et al. | 701/11 |
| 2010/0053111 A1* | 3/2010 | Karlsson | 345/174 |
| 2010/0138680 A1* | 6/2010 | Brisebois et al. | 713/324 |
| 2010/0315376 A1* | 12/2010 | Choi | 345/175 |
| 2011/0199239 A1 | 8/2011 | Lutz et al. | |

OTHER PUBLICATIONS

U.S. Appl. No. 12/707,868, filed Feb. 18, 2010, Lutz et al.
Non-final office action dated Nov. 13, 2012 regarding U.S. Appl. No. 12/707,868, 19 pages.

* cited by examiner

*Primary Examiner* — Srilakshmi K Kumar
*Assistant Examiner* — Insa Sadio
(74) *Attorney, Agent, or Firm* — Yee & Associates, P.C.

(57) ABSTRACT

A method and apparatus for managing a map of an airport. The map of the airport is displayed on a display device. A movement of a number of fingers with respect to a number of aeronautical objects on the map of the airport is detected. Information generated by an operation based on the number of aeronautical objects on the map of the airport is displayed in response to detecting the movement of the number of fingers with respect to the number of aeronautical objects on the map of the airport.

17 Claims, 25 Drawing Sheets

AIRCRAFT CHARTING SYSTEM WITH MULTI-TOUCH INTERACTION GESTURES FOR MANAGING A MAP OF AN AIRPORT

CROSS-REFERENCE TO RELATED APPLICATION

This application is related to patent application Ser. No. 12/707,868, entitled "Aircraft Charting System with Multi-Touch Interaction Gestures for Managing a Route of an Aircraft", filed even date hereof, and incorporated herein by reference.

BACKGROUND INFORMATION

1. Field

The present disclosure relates generally to aircraft and, in particular, to a method and apparatus for processing information for use in operating an aircraft. Still more particularly, the present disclosure relates to a method and apparatus for receiving user input in an application used to operate an aircraft.

2. Background

In operating an aircraft, different documents and maps are used to obtain the information needed for a flight. The maps are visual representations of areas in which an aircraft may operate. A chart is a map designed to assist in the navigation of an aircraft. A chart includes information used to operate the aircraft. The chart may include different navigational aids. For example, a chart may include alternative landing areas, radio frequencies, airspace boundaries, and/or other information.

Currently, paper documents and manuals are being replaced by electronic versions of this type of information. For example, electronic maps are commonly used in flight and at airports. Electronic charts may be presented using a moving map application. A moving map application presents a map in which the aircraft is represented using an icon on the map. The icon is displayed in a position on the map corresponding to the position of the aircraft. The position of the icon indicates at least one of a location of the aircraft and a direction in which the aircraft is facing.

Various operations may be performed using these moving map applications. Information may be entered into a moving map application during various phases of a flight. For example, information may be entered during departure, en route, during arrival, and during approach phases of a flight.

When the moving map application presents a map of an airport, a pilot or other operator may interact with the moving map application. These interactions with the moving map application may include entering and/or viewing information used to operate the aircraft.

For example, the pilot or other operator receives information in voice communications. This information includes, for example, without limitation, an identification of a runway assignment, an identification of a taxiway route, an identification of clearances, a hold short position, a stop position, and/or other suitable types of information.

In response to receiving this information in voice communications, the pilot or other operator enters the information into the moving map application. Currently, the information is entered through a user interface.

For example, a pilot may select a location for an aircraft to stop and hold on the map of the airport. The pilot selects a function to enter information for the particular location. The pilot then identifies the location and enters the information. This information may be entered using, for example, a virtual keyboard provided by the moving map application. The different functions are often presented using buttons or other controls on the user interface.

Moving map applications reduce the clutter that is caused by paper documents on the flight deck of an aircraft. Additionally, moving map applications also increase the ease of identifying information for use in operating the aircraft. These moving map applications, however, increase the workload of a pilot when preparing for a flight and during flight. For example, the workload is increased through the entering of information into the moving map application.

Thus, it would be advantageous to have a method and apparatus that takes into account at least some of the issues discussed above, as well as possibly other issues.

SUMMARY

In one advantageous embodiment, a method is present for managing a route for an aircraft. The route for the aircraft is displayed on a map on a display device. A movement of a number of fingers with respect to a number of aeronautical objects on the map is detected. The route for the aircraft is changed in response to detecting the movement of the number of fingers.

In another advantageous embodiment, a method is present for managing a map of an airport. The map of the airport is displayed on a display device. A movement of a number of fingers with respect to a number of aeronautical objects on the map of the airport is detected. Information generated by an operation based on the number of aeronautical objects on the map of the airport is displayed in response to detecting the movement of the number of fingers with respect to the number of aeronautical objects on the map of the airport. In yet another advantageous embodiment, a computer system comprises a display device, a storage device, program code stored on the storage device, and a processor unit configured to run the program code. The program code is run to display a route for an aircraft on a map on a display device. The program code is run to detect a movement of a number of fingers with respect to a number of aeronautical objects on the map. The program code is run to change the route for the aircraft in response to detecting the movement of the number of fingers.

In still yet another advantageous embodiment, a computer system comprises a display device, a storage device, program code stored on the storage device, and a processor unit configured to run the program code. The program code is run to display a map of an airport on the display device; detect a movement of a number of fingers with respect to a number of aeronautical objects on the map of the airport; and display information generated by an operation based on the number of aeronautical objects on the map of the airport in response to detecting the movement of the number of fingers with respect to the number of aeronautical objects on the map of the airport.

In another advantageous embodiment, a computer program product comprises a computer recordable storage medium and program code, stored on the computer recordable storage medium. Program code is present for displaying a route for an aircraft on a map on a display device. Program code is present for detecting a movement of a number of fingers with respect to a number of aeronautical objects on the map. Program code is present for changing the route for the aircraft in response to detecting the movement of the number of fingers.

In yet another advantageous embodiment, a computer program product comprises a computer recordable storage medium and program code, stored on the computer recordable storage medium. Program code is present for displaying a map of an airport on a display device. Program code is present for detecting a movement of a number of fingers with respect to a number of aeronautical objects on the map of the airport. Program code is present for displaying information generated by an operation based on the number of aeronautical objects on the map of the airport in response to detecting the movement of the number of fingers with respect to the number of aeronautical objects on the map of the airport.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
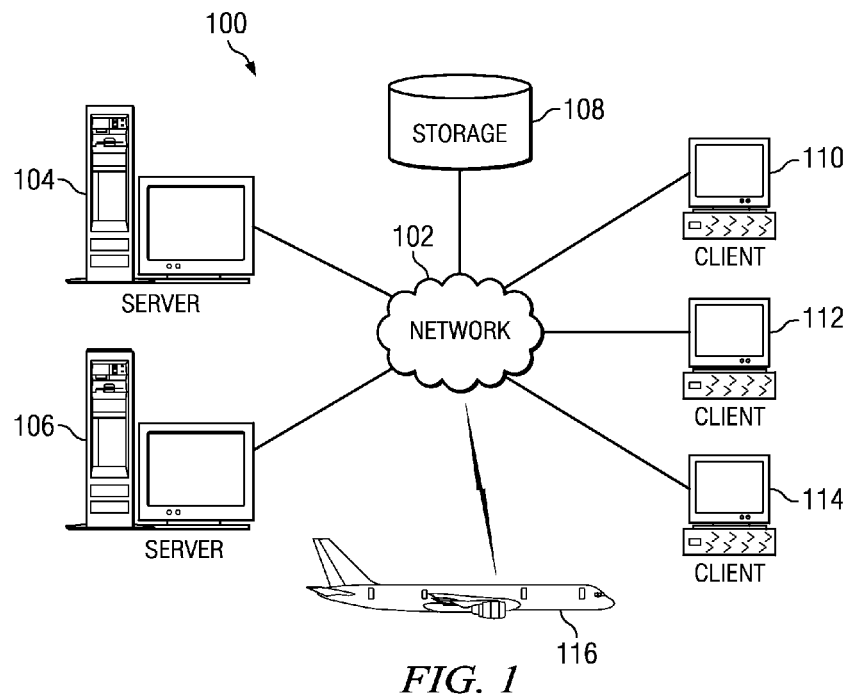
FIG. 1 is a pictorial representation of a network of data processing systems in accordance with an advantageous embodiment.
Figure 2:
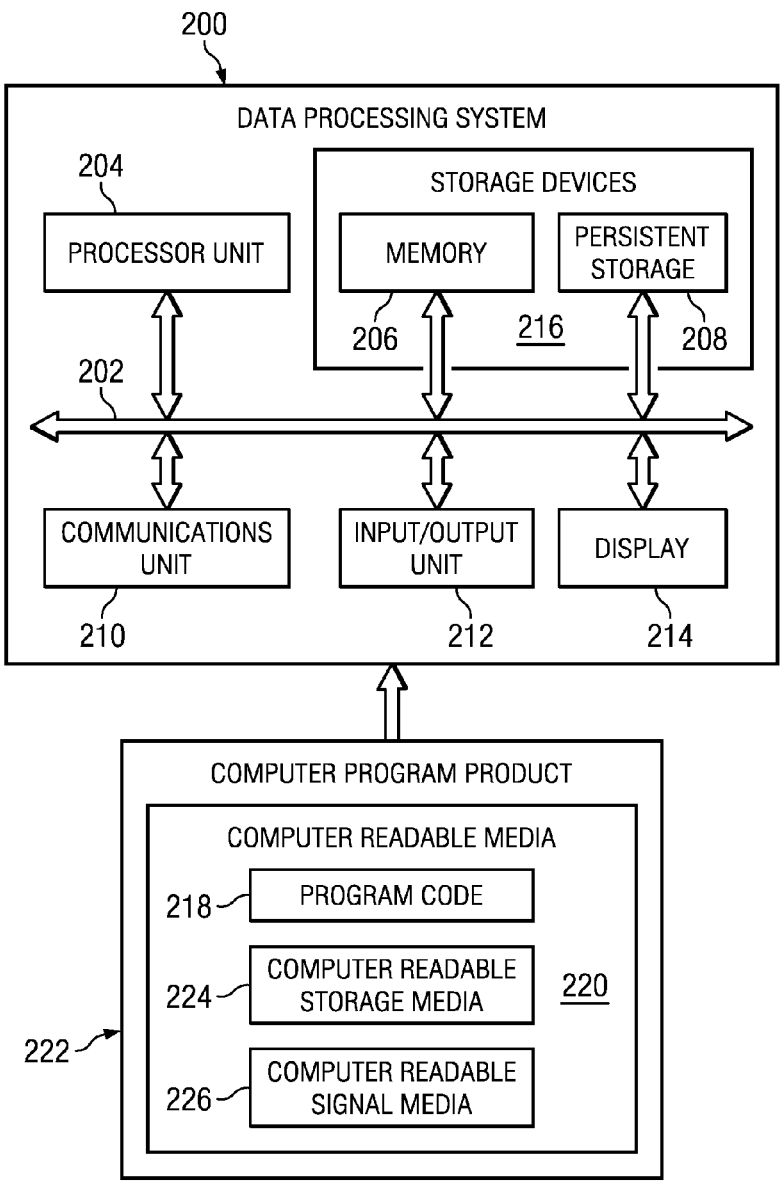
FIG. 2 is a diagram of a data processing system in accordance with an advantageous embodiment.

With reference now to the figures and in particular with reference to FIGS. 1-2, exemplary diagrams of data processing environments are provided in which advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in accordance with an advantageous embodiment. Network data processing system 100 is a network of computers in which embodiments may be implemented. Network data processing system 100 contains network 102, which is the medium used to provide communications links between various devices and computers connected together within network data processing system 100. Network 102 may include connections, such as wires, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides data, such as boot files, operating system images, and applications to client computers 110, 112, and 114. Client computers 110, 112, and 114 are client computers to server computer 104 in this example. Aircraft 116 also is a client having a computer system that may exchange information with client computers 110, 112, and 114. Aircraft 116 also may exchange information with server computers 104 and 106.

Aircraft 116 may exchange data with different computers through a wireless communications link while in-flight or any other type of communications link while on the ground. In these illustrative examples, the computer system in aircraft 116 runs an application to present maps to an operator of aircraft 116. In these illustrative examples, the application may be a moving map application in accordance with an advantageous embodiment.

Network data processing system 100 may include additional server computers, client computers, and/or other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. In this illustrative example, data processing system 200 may be used to implement computers and computer systems within network data processing system 100.

For example, data processing system 200 may be used to implement server computer 104, server computer 106, client computer 110, client computer 112, and/or client computer 114. Additionally, data processing system 200 may be used to implement a number of computers within the computer system in aircraft 116. As used herein, "a number" refers to one or more items. For example, a number of computers refers to one or more computers. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive that is part of persistent storage 208. Computer readable storage medium 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226, Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code 218 stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. The different advantageous embodiments recognize and take into account that currently available moving map applications employ menus, submenus, buttons, and/or other graphical controls to receive user input.

The different advantageous embodiments recognize and take into account that this type of user input is entered using various input devices. For example, user input may be entered through a pointing device and/or a physical or virtual keyboard. As another example, user input may be entered through the use of displays having touch screens.

The different advantageous embodiments also recognize and take into account that the presentation of graphical controls and virtual keyboards on a touch screen may reduce the size of the map that is presented on the touch screen. The different advantageous embodiments recognize and take into account that the information entered by a user often requires multiple user inputs. For example, a user may select the location for the information on the map. Additionally, the user may also select buttons or manipulate controls and menus to enter the information. These user inputs increase the amount of time needed to enter information.

Thus, the different advantageous embodiments provide a method and apparatus for interacting with an application that displays maps. In one advantageous embodiment, a method and apparatus is present for managing the route of an aircraft during flight. A route is displayed on a map on a display device. A movement of a number of fingers with respect to a number of aeronautical objects on the map is detected. The route of the aircraft is changed in response to detecting the movement of the number of fingers.

In another advantageous embodiment, a map of an airport is displayed on the display device. Movement of the number of fingers is detected with respect to a number of aeronautical objects on the map of the airport. Information is displayed in response to detecting the movement of the number of fingers with respect to the number of aeronautical objects on the map of the airport.

In the different illustrative examples, detecting the movement of the number of fingers with respect to the number of aeronautical objects on the map may be detecting at least one of a placement of the number of fingers with respect to the number of aeronautical objects on the map, a movement of the number of fingers to a number of positions with respect to the number of aeronautical objects on the map, and/or other types of movements of the number of fingers involving the number of aeronautical objects.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Figure 3:
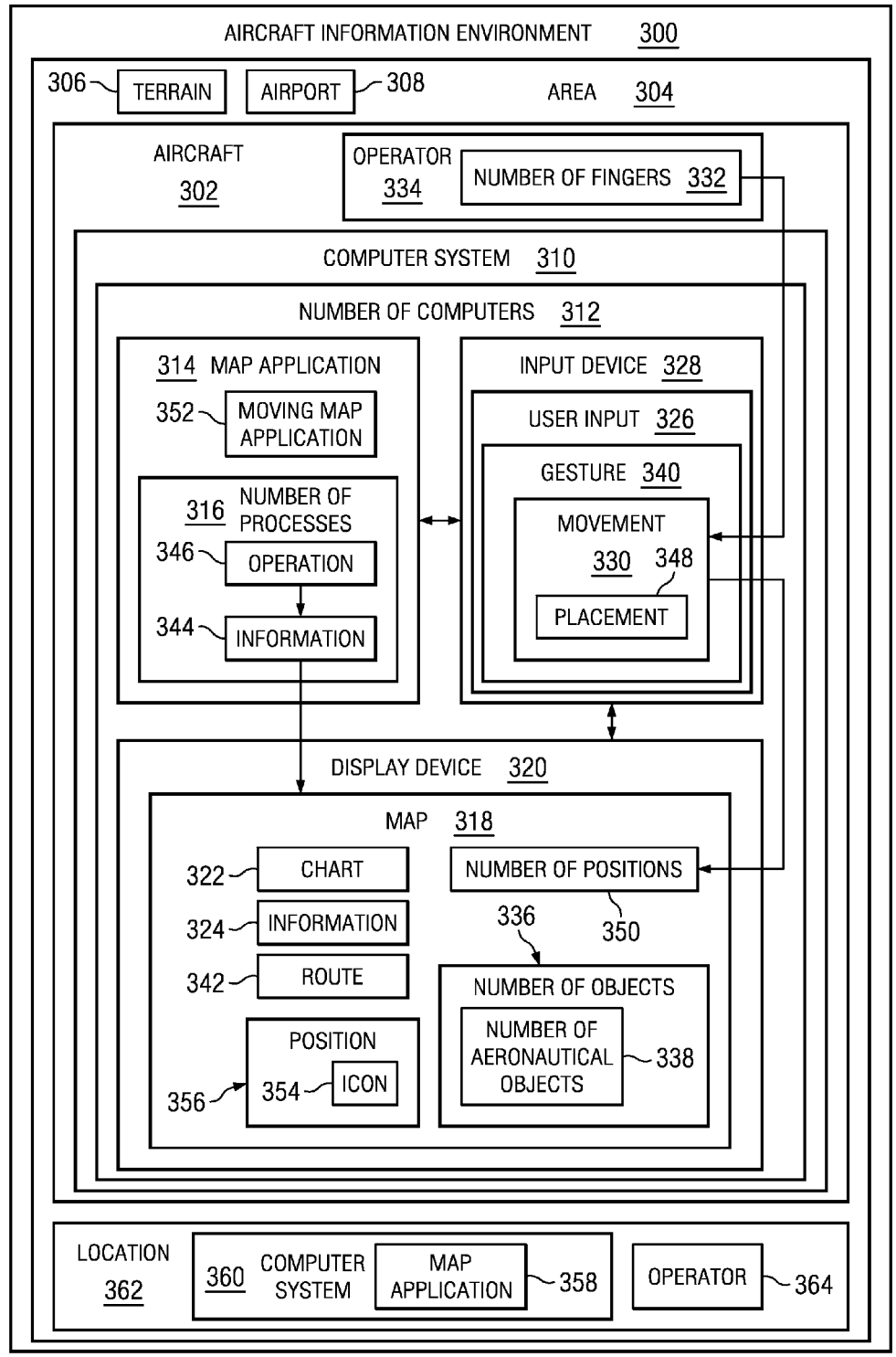
FIG. 3 is an illustration of an aircraft information environment in accordance with an advantageous embodiment.

With reference now to FIG. 3, an illustration of an aircraft information environment is depicted in accordance with an advantageous embodiment. Network data processing system 100 in FIG. 1 is an example of a system that may be used to implement aircraft information environment 300 in FIG. 3.

In this illustrative example, aircraft 302 operates within area 304. Area 304 includes terrain 306 over which aircraft 302 may fly. Additionally, area 304 also includes airport 308. Aircraft 302 may land at or take off from airport 308. Additionally, aircraft 302 may move on the ground within airport 308.

In these illustrative examples, aircraft 302 includes computer system 310. Computer system 310 comprises number of computers 312. Number of computers 312 may be implemented using data processing system 200 in FIG. 2. In these illustrative examples, number of computers 312 may take a number of different forms. For example, without limitation, number of computers 312 may be an electronic flight bag, a navigation computer, a flight management system, or some other type of data processing system.

As depicted, map application 314 runs on number of computers 312 in computer system 310. In this example, map application 314 includes number of processes 316.

Map application 314 displays map 318 on display device 320 within computer system 310. In these illustrative examples, map 318 is a map of area 304. In particular, map 318 may be a map of terrain 306 and/or airport 308. In these illustrative examples, map 318 takes the form of chart 322.

Map 318 is used by a pilot and/or other operator to operate aircraft 302 in these illustrative examples. Information 324 presented on map 318 is selected through user input 326 using input device 328 in computer system 312. Input device 328 may take a number of forms. For example, input device 328 may be a touch screen on display device 320, a depth aware camera, a stereo camera system, or some other gesture detection device.

In these illustrative examples, user input 326 includes gesture 340. Gesture 340 is a bodily action used as user input. In these illustrative examples, gesture 340 is movement 330 of number of fingers 332 for operator 334. Of course, gesture 340 may take other forms. For example, gesture 340 may include the movement of other portions of the body such as the hand, arm, or face, and/or other types of user input. Gesture 340 also may include facial expressions.

In these illustrative examples, movement 330 of number of fingers 332 to form gesture 340 is with respect to number of objects 336 displayed on map 318. Movement 330 of number of fingers 332 with respect to number of objects 336 may take a number of different forms. For example, movement 330 of number of fingers 332 with respect to number of objects 336 may include at least one of placement 348 of number of fingers 332 with respect to number of objects 336 on map 318, movement 330 of number of fingers 332 to number of positions 350 with respect to number of objects 336 on map 318, and other suitable movements of number of fingers 332.

Number of objects 336 is number of aeronautical objects 338 in these illustrative examples. An aeronautical object is any object that may relate to the operation of aircraft 302. An aeronautical object may be, for example, without limitation, a movement area, a runway, a taxiway, a tower, a route displayed on map 318, a waypoint displayed on map 318, an aircraft, an icon, a terminal, a location on a side of a runway, a location on a side of a taxiway, or some other object.

With the use of gesture 340, user input 326 may be made less complicated as compared to currently used systems. Currently used systems involve entering text, selecting different controls, menus, sub-menus, and actions, and other forms of user input.

Operation 346 is performed in response to input device 328 detecting gesture 340. In these illustrative examples, operation 346 is performed in response to input device 328 detecting movement 330 of number of fingers 332 with respect to number of objects 336. Operation 346 may include performing calculations for routes, making changes to map 318, and/or other suitable types of operations.

Operation 346 generates information 344 based on number of objects 336 from movement 330 of number of fingers 332. Information 344 is displayed on map 318 in these examples.

In these depicted examples, information 344 may include at least a portion of information 324 and other suitable information. Information 344 may include, for example, changes to a route, changes to map 318, an identification of an object displayed on map 318, an identification of a position, and other suitable information.

In these illustrative examples, information 344 is used to make changes to map 318. These changes may include changes to what is displayed on map 318, how map 318 is displayed, and/or other suitable types of changes. For example, information 344 may be used to change a view of map 318, rotate map 318, zoom in to or out of map 318, center map 318, and/or make other suitable changes to map 318. Information 344 may also be used to display icons on map 318, display changes to a route on map 318, display a new route on map 318, highlight an object displayed on map 318, and/or make other suitable changes to what is displayed on map 318.

As one illustrative example, when aircraft 302 is in flight over terrain 306, route 342 is displayed on map 318 on display device 320. Movement 330 of number of fingers 332 with respect to number of objects 336 is detected by input device 328. In this example, operation 346 is performed to generate changes to route 342 for aircraft 302 in response to detecting movement 330 of number of fingers 332. These changes to route 342 are displayed on map 318.

In another illustrative example, map 318 displays airport 308 on display device 320. Movement 330 of number of fingers 332 is detected using input device 328 to form user input 326. In response to detecting movement 330 of number of fingers 332, operation 346 is performed to rotate map 318 of airport 308 on display device 320 in this example.

In these illustrative examples, map application 314 takes the form of moving map application 352. Moving map application 352 displays icon 354 on map 318. Icon 354 represents aircraft 302. Icon 354 is displayed in position 356 on map 318. Position 356 indicates at least one of a location of aircraft 302 and a direction in which aircraft 302 is facing. As aircraft 302 moves, icon 354 is moved on map 318 to represent the position of aircraft 302.

The illustration of aircraft information environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other advantageous embodiments, map application 358 may run on computer system 360 at location 362. Location 362 may be, for example, another aircraft, a ground control system, a flight control tower, or some other suitable location. Map application 358 may detect a movement of a number of fingers of operator 364 at location 362. In this manner, information or changes to route 342 may be sent to map application 314 running on computer system 310 in aircraft 302. With this type of implementation, operator 364 may transmit changes to route 342 or information to computer system 310 in aircraft 302 for use by operator 334 to operate aircraft 302.

Figure 4:
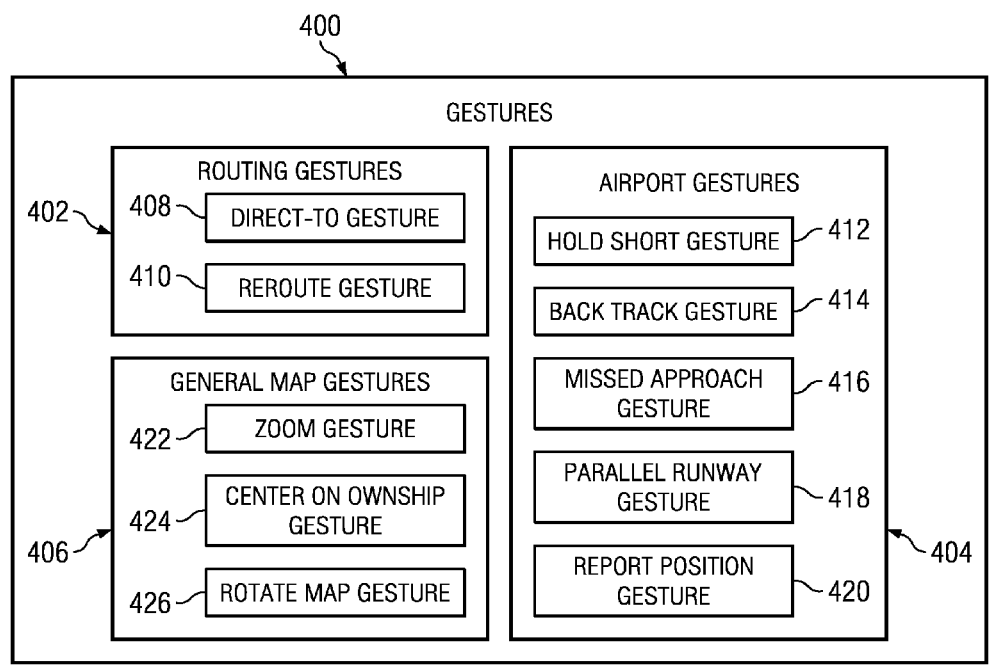
FIG. 4 is an illustration of types of gestures in accordance with an advantageous embodiment.

With reference now to FIG. 4, an illustration of types of gestures is depicted in accordance with an advantageous embodiment. In this illustrative example, gestures 400 are examples of types of gestures that may form gesture 340 in FIG. 3.

In this illustrative example, gestures 400 comprise routing gestures 402, airport gestures 404, and general map gestures 406. Routing gestures 402 include direct-to gesture 408 and reroute gesture 410. In this example, airport gestures 404 include hold short gesture 412, back track gesture 414, missed approach gesture 416, parallel runway gesture 418, and report position gesture 420. General map gestures 406 include zoom gesture 422, center on ownship 424, and rotate map gesture 426.

With reference now to FIGS. 5-22, illustrations of gestures and the results of gestures are depicted in accordance with an advantageous embodiment. The gestures depicted in these figures are examples of some implementations for gesture 340 in FIG. 3 and gestures 400 in FIG. 4. In these illustrative examples, these gestures are performed using touch screen 502. Further, the results of these gestures are displayed on maps displayed on touch screen 502.

Figure 5:
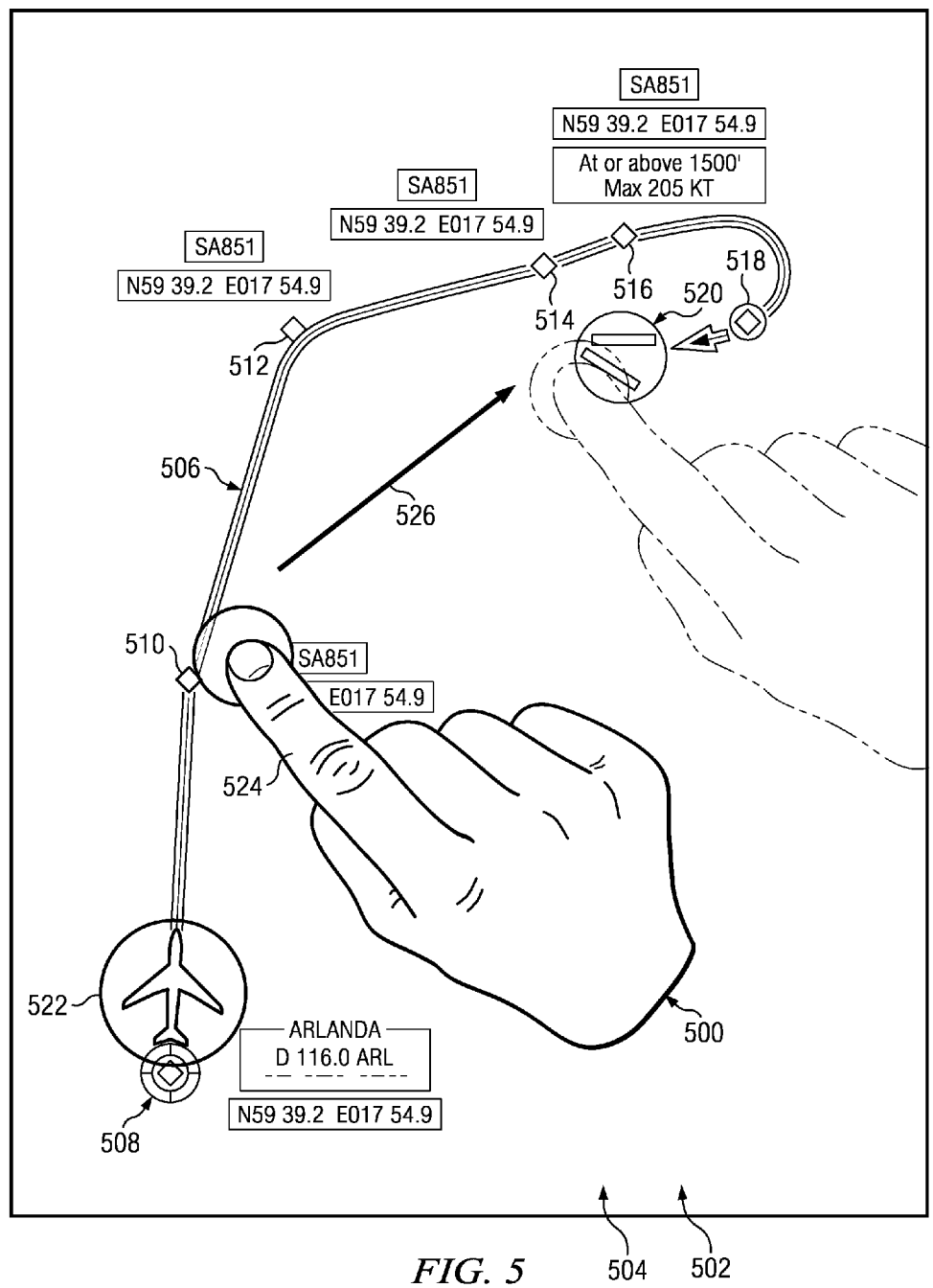
FIG. 5 is an illustration of a direct-to gesture in accordance with an advantageous embodiment.

With reference now to FIG. 5, an illustration of a direct-to gesture is depicted in accordance with an advantageous embodiment. In this illustrative example, direct-to gesture 500 is an example of one implementation for direct-to gesture 408 in FIG. 4. Direct-to gesture 500 is performed using touch screen 502.

In these illustrative examples, touch screen 502 is an example of one implementation for input device 328 and display device 320 in FIG. 3. In other words, touch screen 502 functions as both an input device and a display device in these depicted examples.

Map 504 is displayed on touch screen 502. Map 504 is a moving map in these examples. Route 506 is displayed on map 504. Waypoints 508, 510, 512, 514, 516, 518, and 520 are also displayed on map 504. Waypoints 508, 510, 512, 514, 516, and 518 are for route 506. Route 506 is for an aircraft represented by aircraft icon 522 displayed on map 504. The position of aircraft icon 522 on map 504 indicates at least one of a location of the aircraft and a direction in which the aircraft is facing.

In this illustrative example, direct-to gesture 500 is performed to direct the aircraft from a selected waypoint on map 504 to another selected waypoint on map 504. As depicted, direct-to gesture 500 is formed by placing finger 524 at waypoint 510 and sliding finger 524 from waypoint 510 to waypoint 520. Finger 524 slides in the direction of arrow 526. The placement of finger 524 at waypoint 510 includes tapping finger 524 on waypoint 510 in this depicted example.

Figure 6:
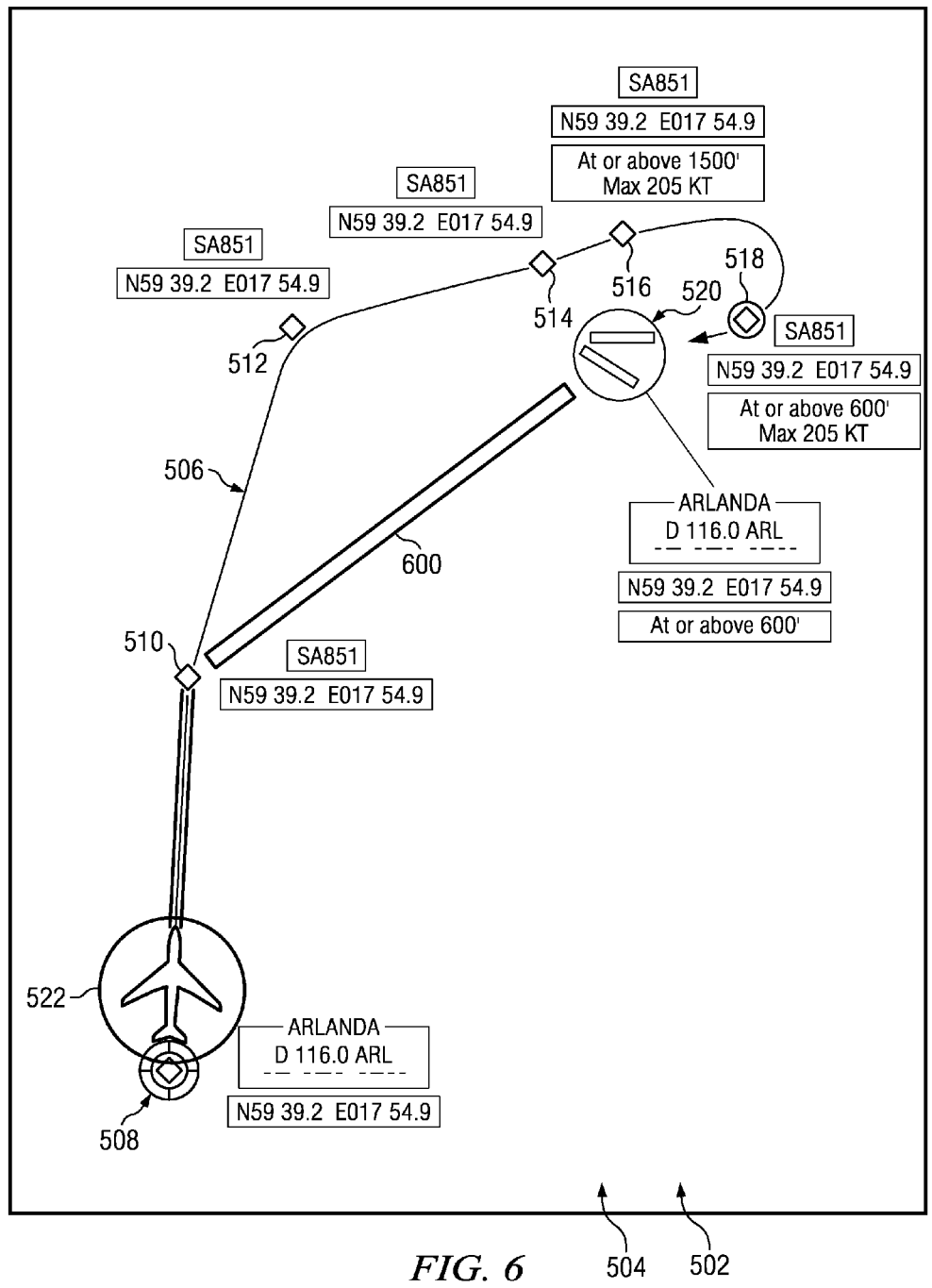
FIG. 6 is an illustration of a result of a direct-to gesture in accordance with an advantageous embodiment.

With reference now to FIG. 6, an illustration of a result of a direct-to gesture is depicted in accordance with an advantageous embodiment. In this illustrative example, new route 600 is displayed on map 504 in response to detecting direct-to gesture 500 in FIG. 5. As depicted, new route 600 is displayed from waypoint 510 to waypoint 520.

Figure 7:
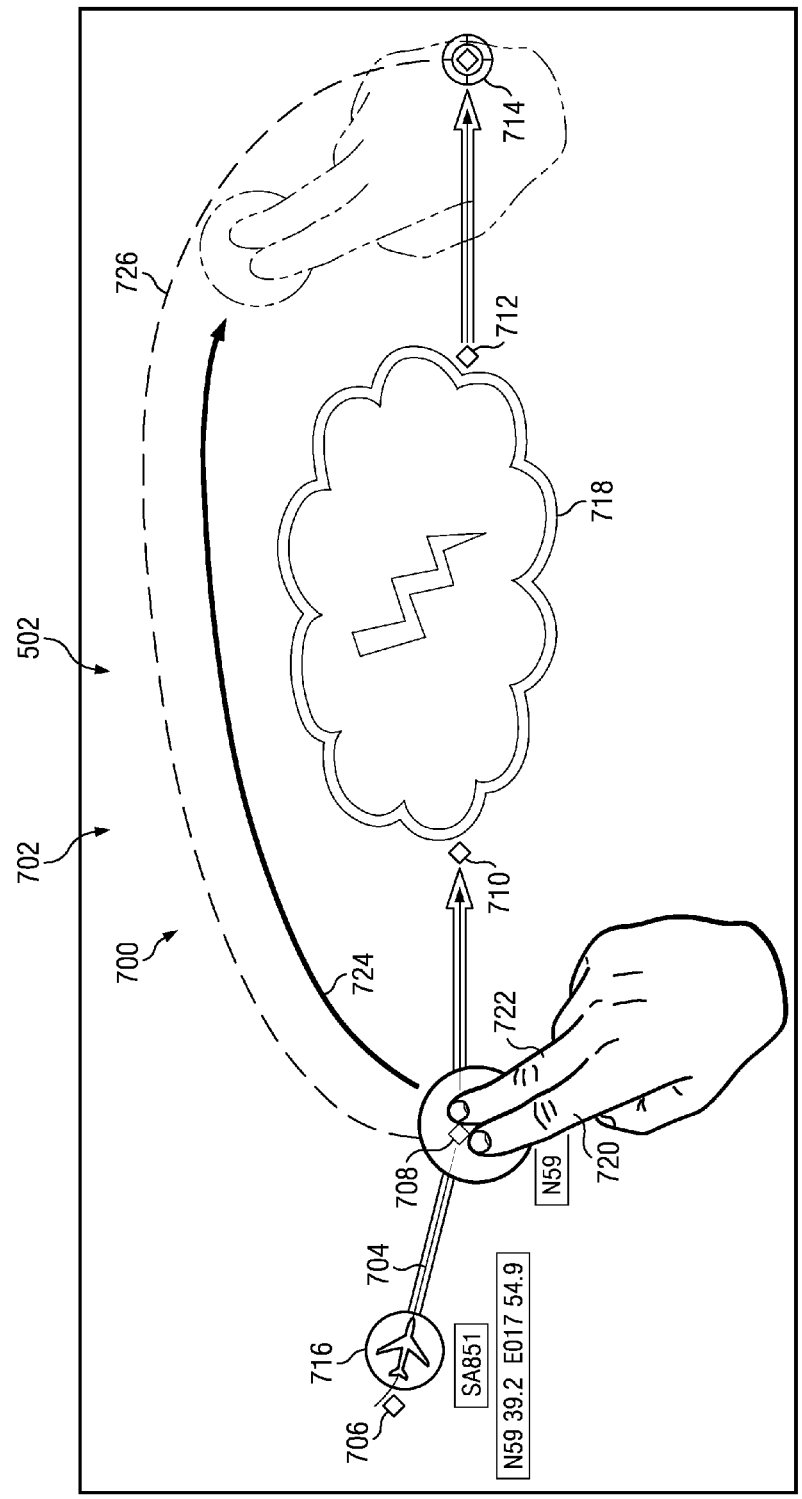
FIG. 7 is an illustration of a reroute gesture in accordance with an advantageous embodiment.

With reference now to FIG. 7, an illustration of a reroute gesture is depicted in accordance with an advantageous embodiment. In this illustrative example, reroute gesture 700 is an example of one implementation for reroute gesture 410 in FIG. 4. Reroute gesture 700 is performed using touch screen 502.

In this illustrative example, map 702 is displayed on touch screen 502. Map 702 is a moving map. Route 704 and waypoints 706, 708, 710, 712, and 714 for route 704 are displayed on map 702. Route 704 is for the aircraft represented by aircraft icon 716 displayed on map 704.

As depicted, weather icon 718 is also displayed on map 704. Weather icon 718 indicates the presence of a weather condition along route 704. In this depicted example, the weather condition is a thunderstorm.

Reroute gesture 700 is performed to change the route of the aircraft to avoid an obstacle. The obstacle may be, for example, without limitation, a weather condition, a geographic obstacle such as a mountain, a restricted airspace, and/or some other suitable obstacle. In this depicted, example, the obstacle is the weather condition represented by weather icon 718.

In this illustrative example, reroute gesture 700 is formed by placing finger 720 and finger 722 at waypoint 708 and sliding finger 720 and finger 722 from waypoint 708 to waypoint 714. Finger 720 and finger 722 slide in the direction of arrow 724. This sliding of finger 720 and finger 722 forms curve 726 around weather icon 718 from waypoint 708 to waypoint 714. The placement of finger 720 and finger 722 at waypoint 708 includes tapping finger 720 and finger 722 at waypoint 708 in this depicted example.

Figure 8:
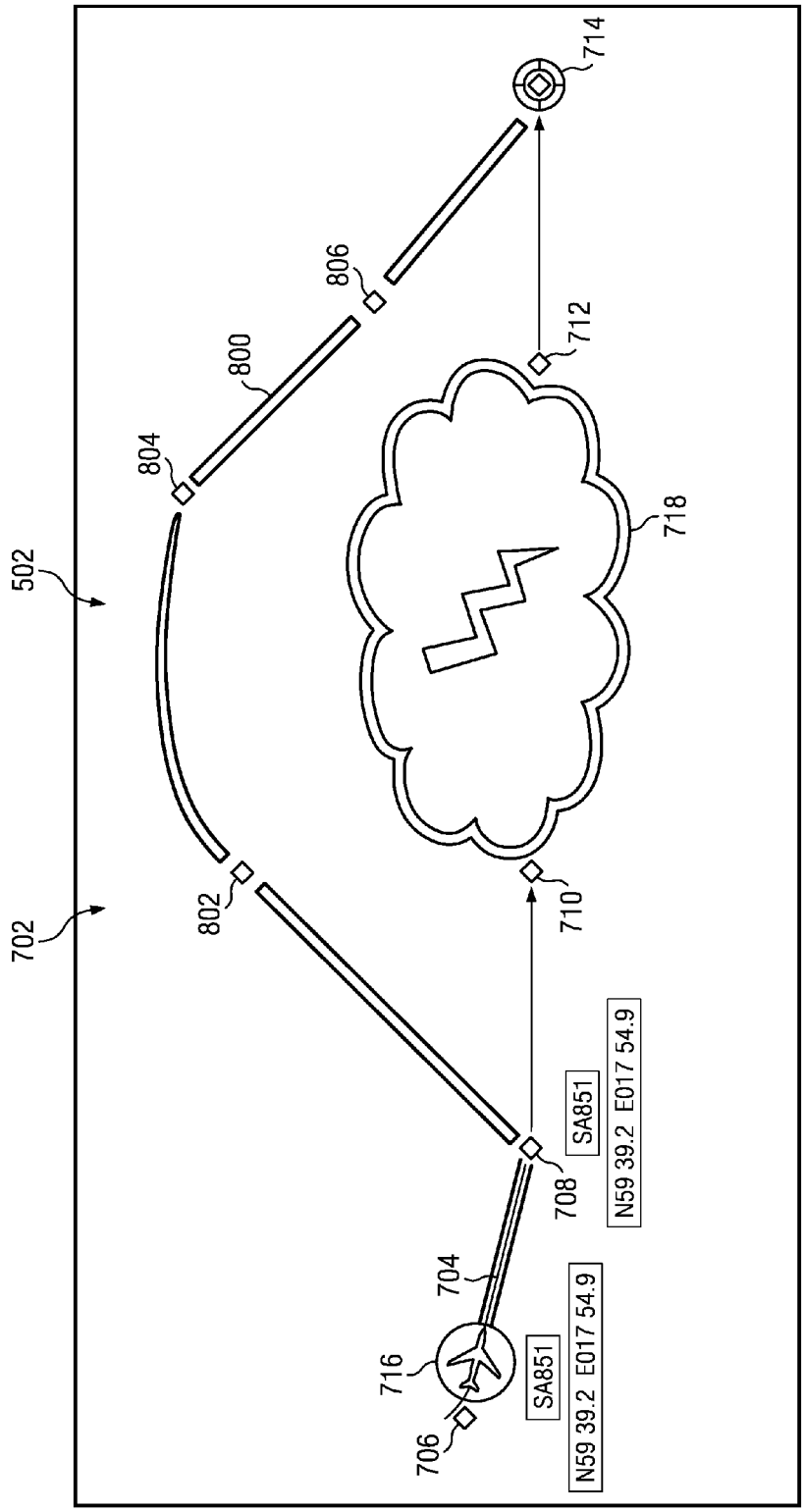
FIG. 8 is an illustration of a result of a reroute gesture in accordance with an advantageous embodiment.

With reference now to FIG. 8, an illustration of a result of a reroute gesture is depicted in accordance with an advantageous embodiment. In this illustrative example, new route 800 is displayed on map 702 in response to detecting reroute gesture 700 in FIG. 7. New route 800 includes waypoints 802, 804, and 806. New route 800 is selected such that the area under curve 726 in FIG. 7 is avoided by the aircraft. In this manner, the weather condition represented by weather icon 718 is avoided.

Figure 9:
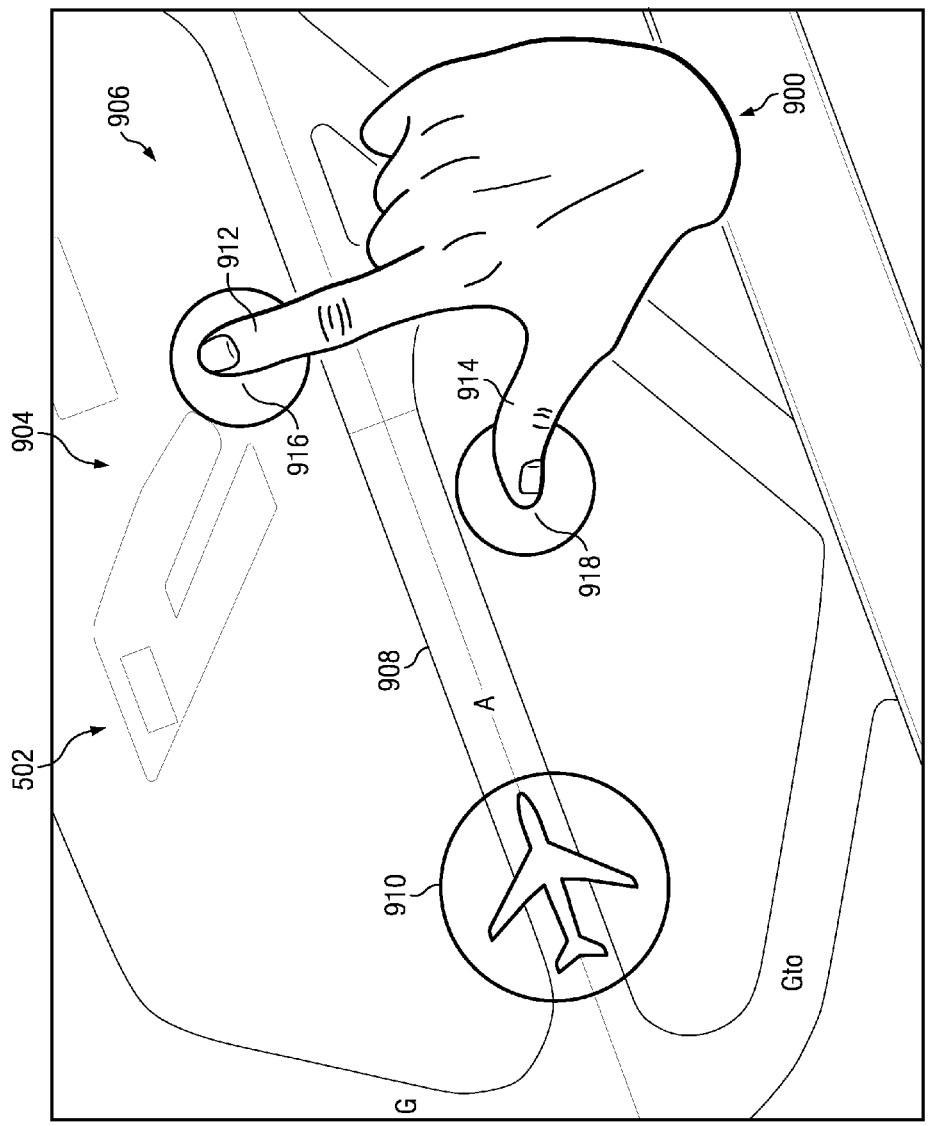
FIG. 9 is an illustration of a hold short gesture in accordance with an advantageous embodiment.

With reference now to FIG. 9, an illustration of a hold short gesture is depicted in accordance with an advantageous embodiment. In this illustrative example, hold short gesture 900 is an example of one implementation for hold short gesture 412 in FIG. 4.

Hold short gesture 900 is performed using touch screen 502. Map 904 is displayed on touch screen 502. Map 904 is for airport 906. Map 904 is a moving map in this example. Taxiway 908 and aircraft icon 910 are displayed on map 904.

Hold short gesture 900 is performed to indicate a location on taxiway 908 at which the aircraft represented by aircraft icon 910 is to stop and hold. In this illustrative example, hold short gesture 900 is formed by the movement of finger 912 and finger 914 on map 904. Finger 912 is placed at location 916 on one side of taxiway 908 and finger 914 is placed at location 918 on the other side of taxiway 908 on map 904. The placement of finger 912 and finger 914, in this illustrative example, includes pressing down finger 912 at location 916 and pressing down finger 914 at location 918 on map 904.

The location on taxiway 908 between location 916 and location 918 is the location at which the aircraft is to stop and hold.

Figure 10:
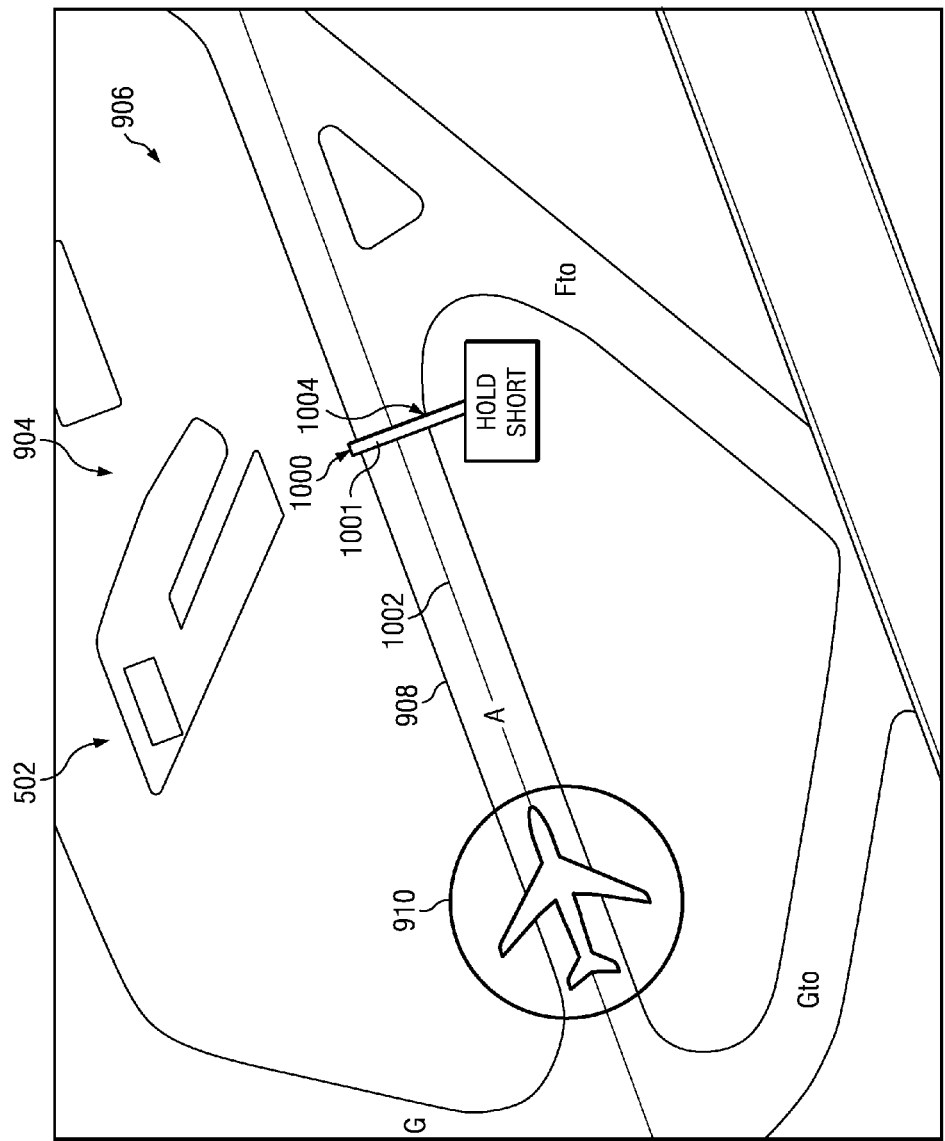
FIG. 10 is an illustration of a result of a hold short gesture in accordance with an advantageous embodiment.

With reference now to FIG. 10, an illustration of a result of a hold short gesture is depicted in accordance with an advantageous embodiment. In this illustrative example, marker 1000 is displayed on map 904 in response to detecting hold short gesture 900 in FIG. 9.

Marker 1000 takes the form of line 1001 in this depicted example. In other advantageous embodiments, marker 1000 may take the form a graphical indicator, an icon, a symbol, or some other suitable type of marker.

Line 1001 is substantially perpendicular to centerline 1002 of taxiway 908 in this example. Further, line 1000 is at location 1004 on taxiway 908. Location 1004 on taxiway 908 indicates where the aircraft is to stop and hold.

Figure 11:
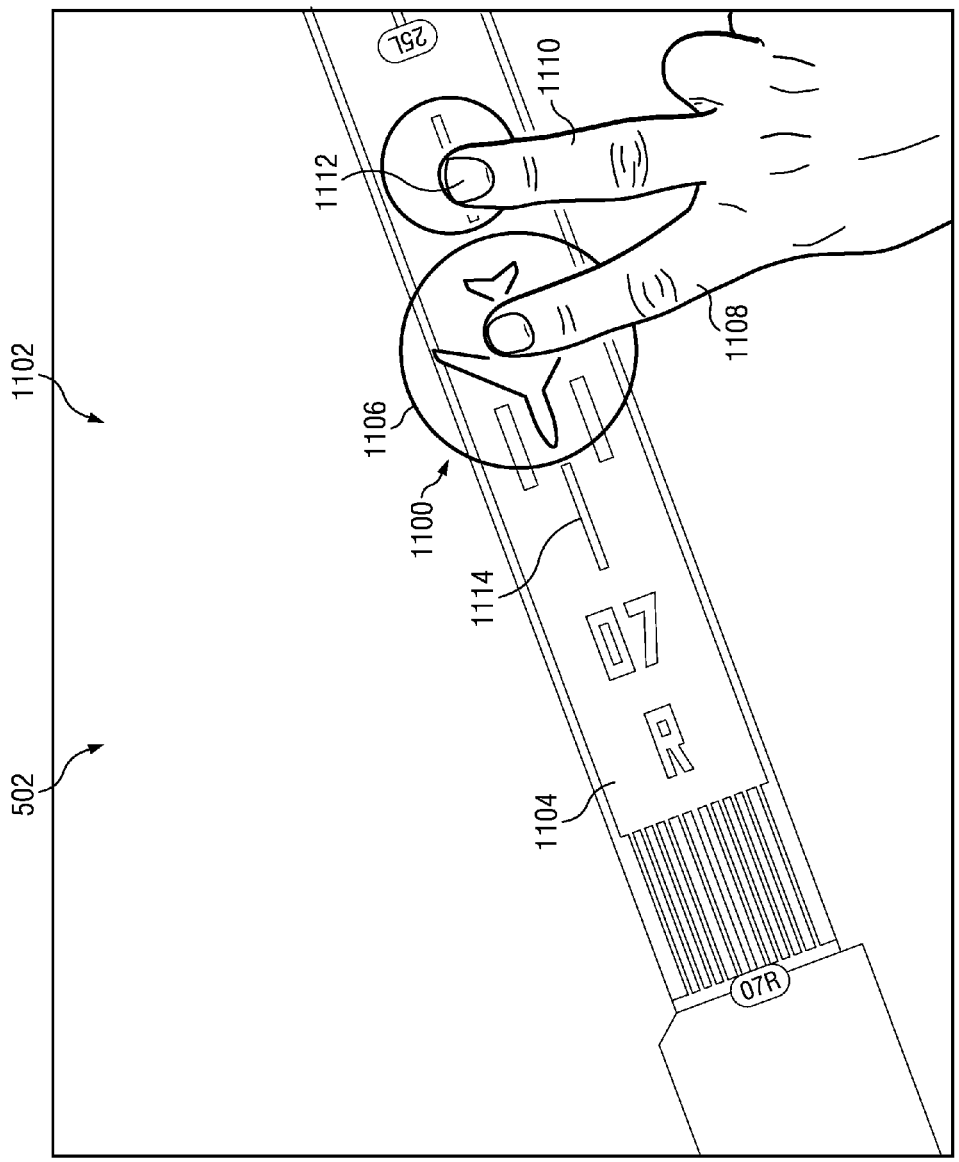
FIG. 11 is an illustration of a back track gesture in accordance with an advantageous embodiment.

With reference now to FIG. 11, an illustration of a back track gesture is depicted in accordance with an advantageous embodiment. In this illustrative example, back track gesture 1100 is an example of one implementation for back track gesture 414 in FIG. 4.

Back track gesture 1100 is performed using touch screen 502. Map 1102 is displayed on touch screen 502. Map 1102 is a moving map. Runway 1104 and aircraft icon 1106 are displayed on map 1102 in this illustrative example.

Back track gesture 1100 is performed to turn an aircraft around. For example, back track gesture 1100 is performed to turn the aircraft represented by aircraft icon 1106 around by about 180 degrees. In this illustrative example, back track gesture 1100 is performed while the aircraft is moving. However, in other advantageous embodiments, back track gesture 1100 may be performed while the aircraft is in a hold position.

As depicted, back track gesture 1100 is formed by placing finger 1108 on aircraft icon 1106 and finger 1110 on point 1112 substantially simultaneously. Point 1112 may be any point along centerline 1114 of runway 1104 behind aircraft icon 1106. In this illustrative example, the placement of finger 1108 and finger 1110 includes pressing down finger 1108 and finger 1110.

Figure 12:
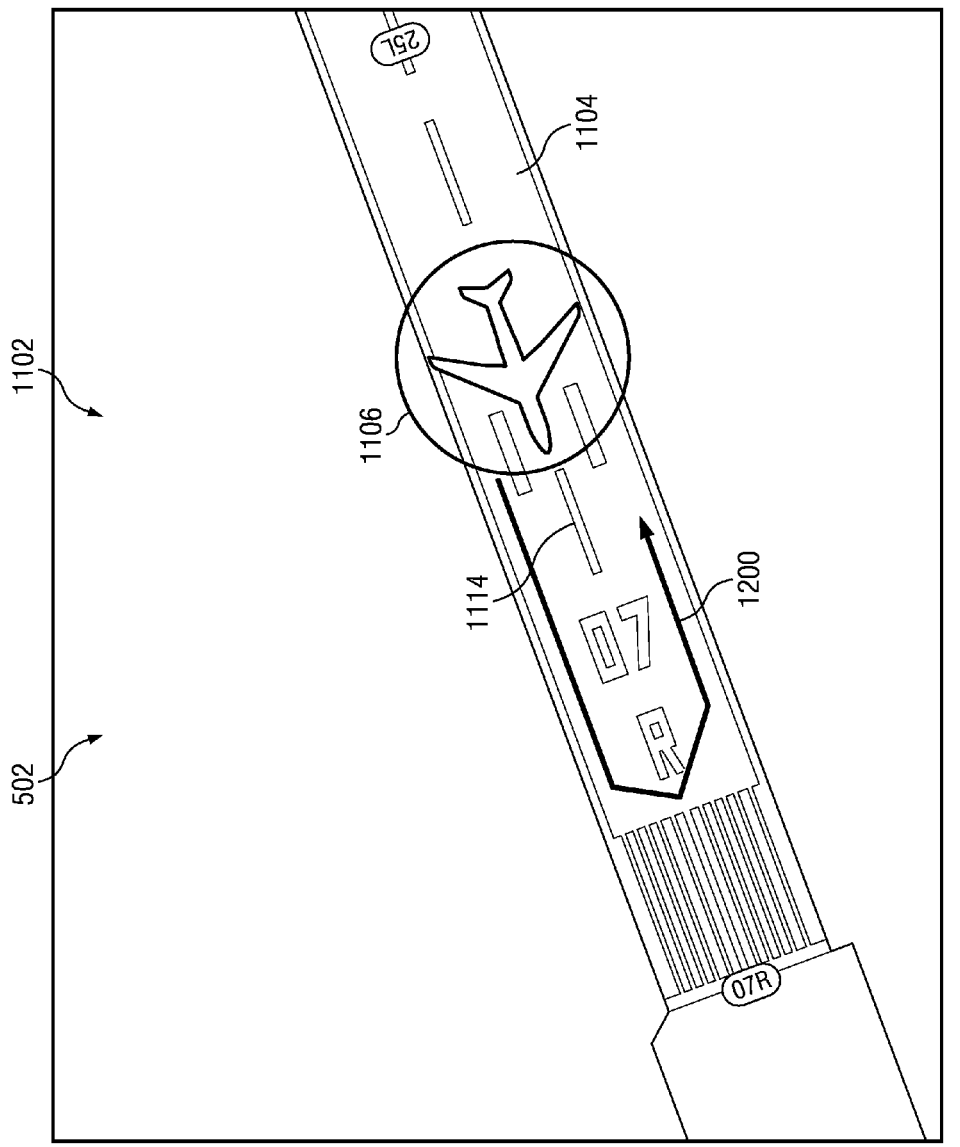
FIG. 12 is an illustration of a result of a back track gesture in accordance with an advantageous embodiment.

With reference now to FIG. 12, an illustration of a result of a back track gesture is depicted in accordance with an advantageous embodiment. In this illustrative example, path 1200 is displayed on map 1102 in response to detecting back track gesture 1100 in FIG. 11. Path 1200 indicates the path for the aircraft to take to turn around on runway 1104.

Figure 13:
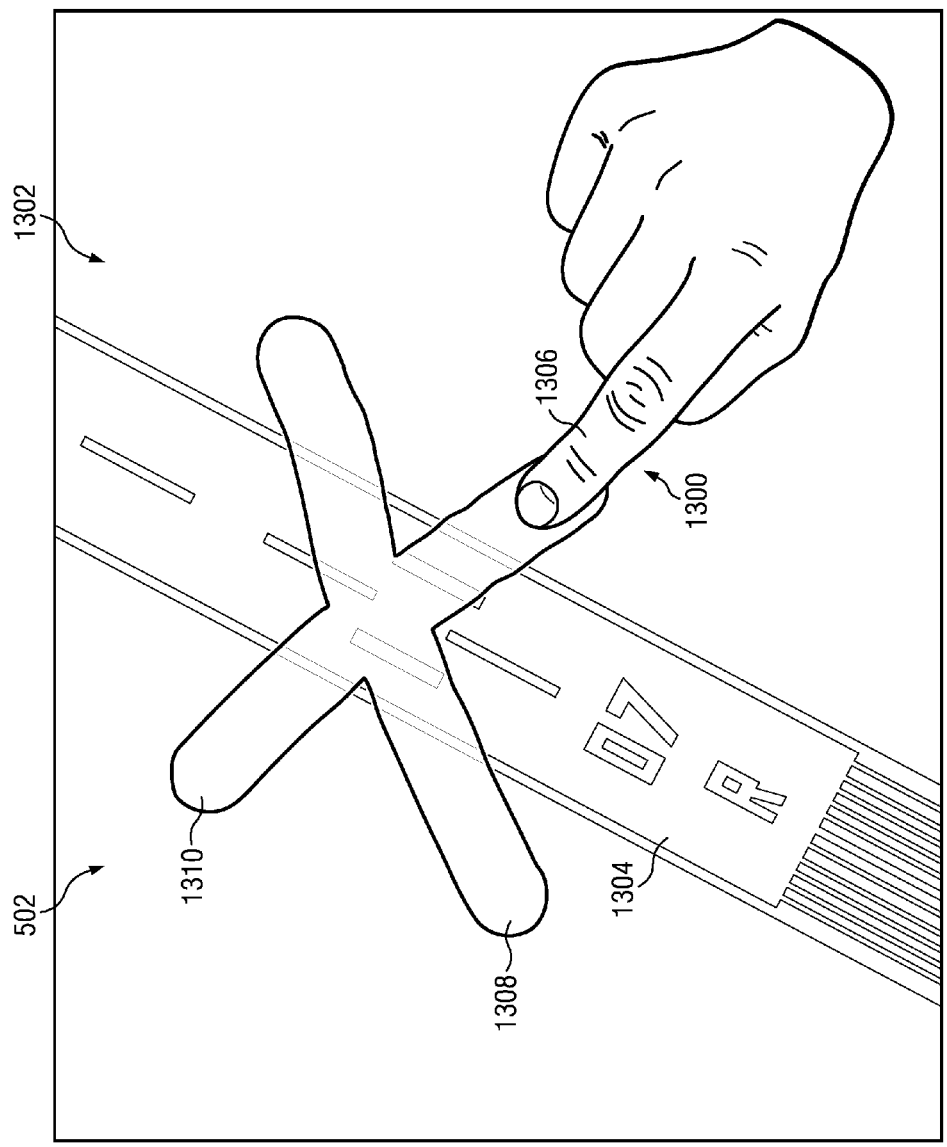
FIG. 13 is an illustration of a missed approach gesture in accordance with an advantageous embodiment.

With reference now to FIG. 13, an illustration of a missed approach gesture is depicted in accordance with an advantageous embodiment. In this illustrative example, missed approach gesture 1300 is an example of one implementation for missed approach gesture 416 in FIG. 4. Missed approach gesture 1300 is performed using touch screen 502.

Map 1302 is displayed on touch screen 502. Map 1302 is a moving map in this illustrative example. Runway 1304 is displayed on map 1302.

Missed approach gesture 1300 may be performed to indicate a missed approach by an aircraft approaching runway 1304. A missed approach occurs when an aircraft approaching runway 1304 does not have runway 1304 in sight and/or is unable to land as desired on runway 1304.

In this illustrative example, missed approach gesture 1300 is formed by moving finger 1306 on map 1302. Finger 1306 is moved on map 1302 along line 1308 and line 1310. As depicted, line 1308 and line 1310 cross each other in the form of an "X". Line 1308 and line 1310 cross each other on runway 1304. However, in other advantageous embodiments, line 1308 and line 1310 may cross each other in a different location on map 1302. In other illustrative embodiments, finger 1306 may be moved on map 1302 along other lines or curves to form different shapes.

In these illustrative examples, line 1308 and line 1310 are displayed on map 1302. However, in other examples, only the movement of finger 1306 is detected along line 1308 and line 1310. These lines are not actually displayed on map 1302.

Figure 14:
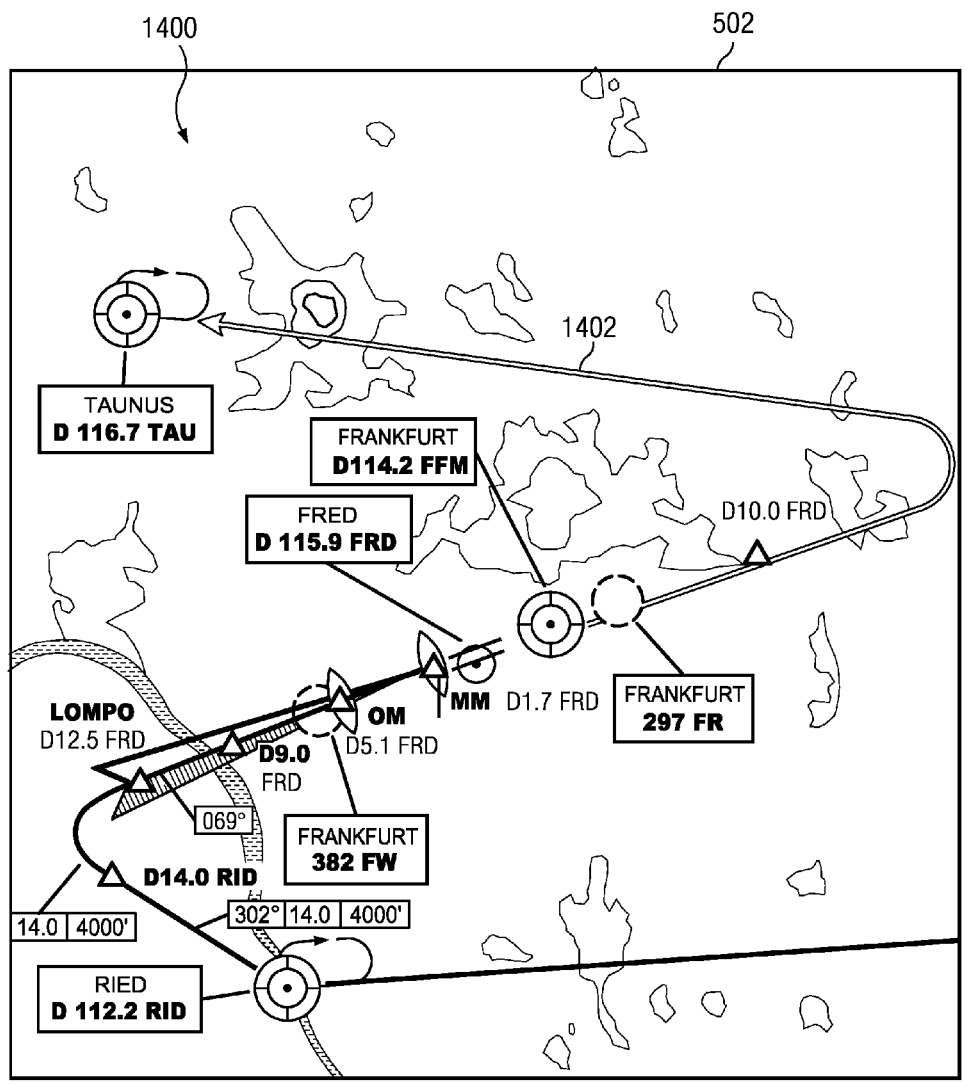
FIG. 14 is an illustration of a result of a missed approach gesture in accordance with an advantageous embodiment.

With reference now to FIG. 14, an illustration of a result of a missed approach gesture is depicted in accordance with an advantageous embodiment. In this illustrative example, map 1400 is displayed on touch screen 502 in response to detecting missed approach gesture 1300 in FIG. 13. New route 1402 for the aircraft and other suitable information for the missed approach by the aircraft are displayed on map 1400.

Further, the aircraft operates in a missed approach mode in response to detecting missed approach gesture 1300. The missed approach mode may involve following pre-selected procedures and/or a pre-selected route for a missed approach.

In some illustrative examples, map 1400 may be displayed on a screen other than touch screen 502. Before detecting missed approach gesture 1300 in FIG. 13, map 1402 may be displayed on the other screen without new route 1402 or information for the missed approach. Once missed approach gesture 1300 is detected, new route 1402 may be then displayed on map 1400 on the other screen.

Figure 15:
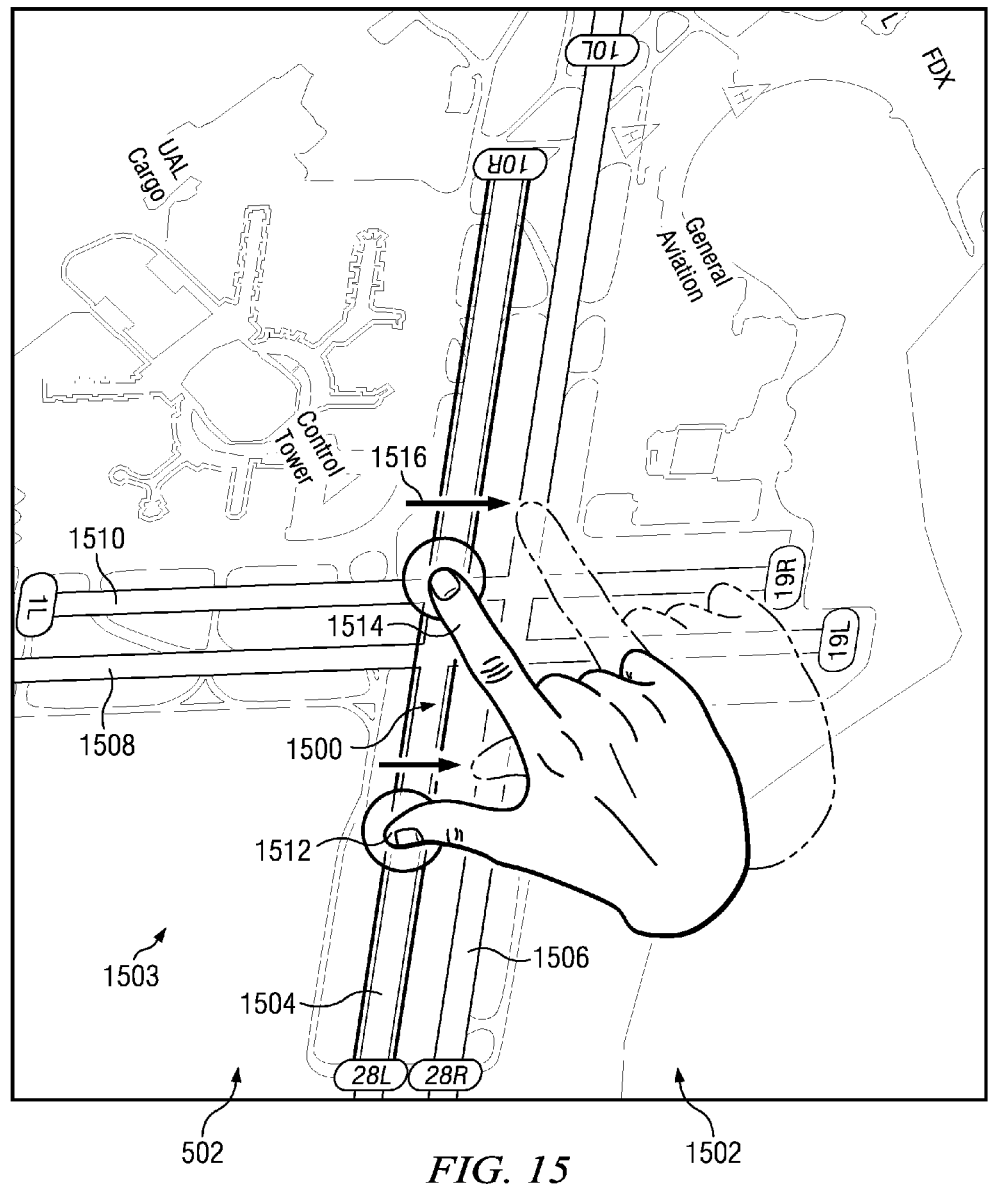
FIG. 15 is an illustration of a parallel runway gesture in accordance with an advantageous embodiment.

With reference now to FIG. 15, an illustration of a parallel runway gesture is depicted in accordance with an advantageous embodiment. In this illustrative example, parallel runway gesture 1500 is an example of one implementation of parallel runway gesture 418 in FIG. 4. Parallel runway gesture 1500 is performed using touch screen 502.

In this depicted example, map 1502 is displayed on touch screen 502. Map 1502 is a moving map. Map 1502 is for airport 1503. Runways 1504, 1506, 1508, and 1510 for airport 1503 are displayed on map 1502. Runway 1504 is highlighted in this illustrative example. The highlighting of runway 1504 indicates that runway 1504 is assigned to an aircraft approaching airport 1503 for a landing.

In this illustrative example, parallel runway gesture 1500 is performed when an aircraft gets reassigned a different runway during an arrival phase of flight for the aircraft. The newly assigned runway is runway 1506 in this depicted example. As depicted, runway 1506 is parallel to runway 1504.

Parallel runway gesture 1500, in this illustrative example, is formed by placing finger 1512 and finger 1514 on runway 1504 and sliding finger 1512 and finger 1514 to runway 1506. Finger 1512 and finger 1514 slide in the direction of arrow 1516. The placement of finger 1512 and finger 1514 on runway 1504 includes tapping finger 1512 and finger 1514 on runway 1504 in this depicted example.

Figure 16:
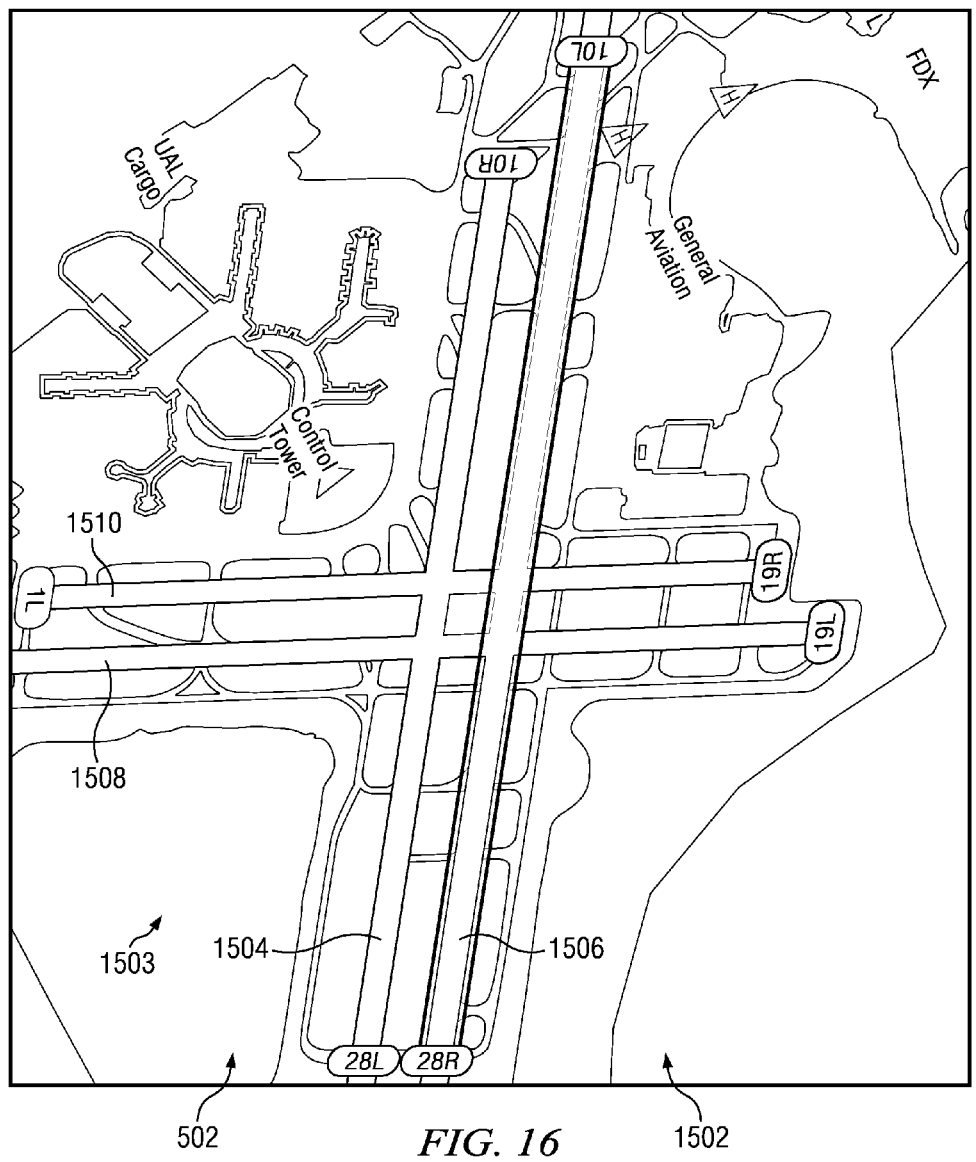
FIG. 16 is an illustration of a result of a parallel runway gesture in accordance with an advantageous embodiment.

With reference now to FIG. 16, an illustration of a result of a parallel runway gesture is depicted in accordance with an advantageous embodiment. In this illustrative example, runway 1506 is highlighted in response to detecting parallel runway gesture 1500 in FIG. 5. The highlighting of runway 1506 indicates that runway 1506 is the assigned runway for the aircraft approaching airport 1503 for landing.

Figure 17:
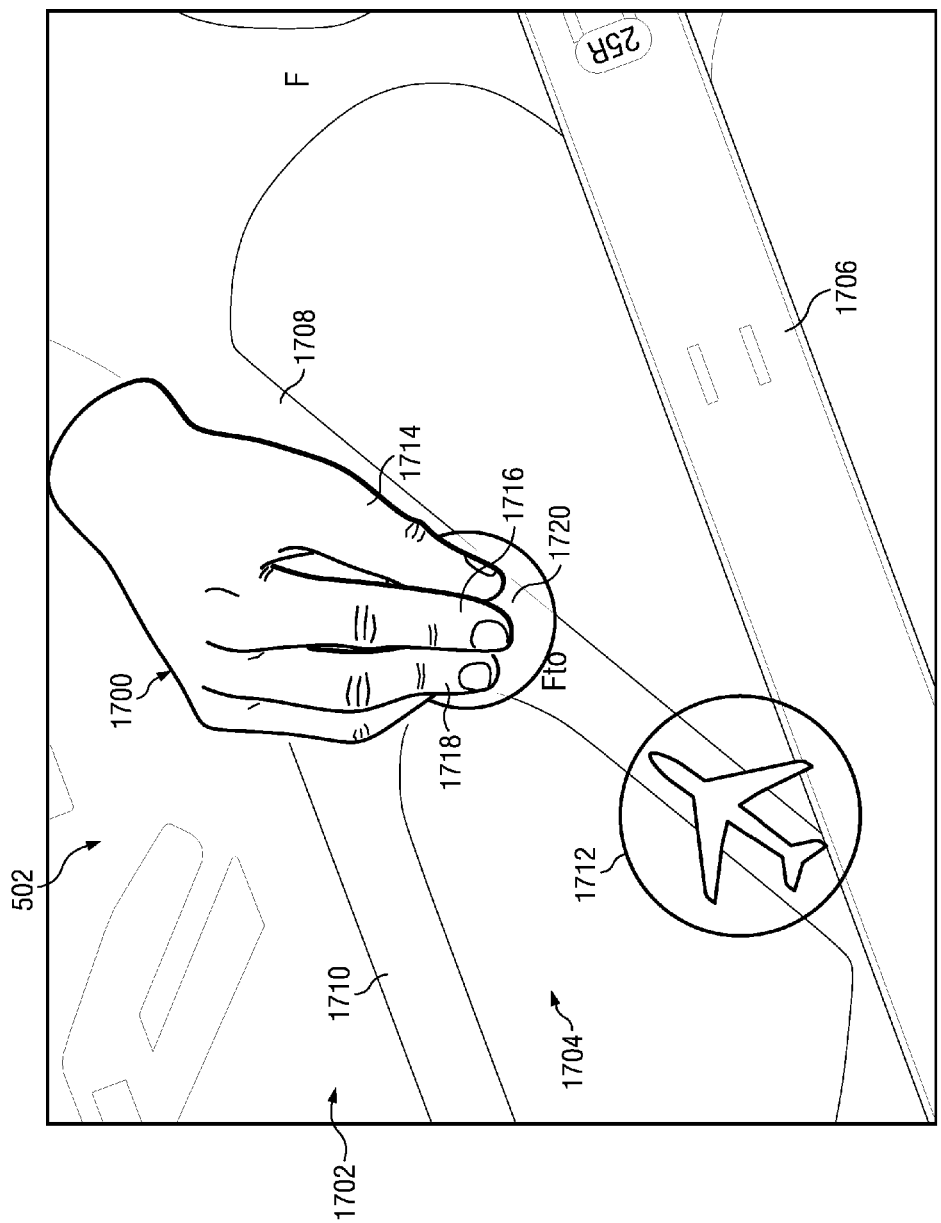
FIG. 17 is an illustration of a report position gesture in accordance with an advantageous embodiment.

With reference now to FIG. 17, an illustration of a report position gesture is depicted in accordance with an advantageous embodiment. In this illustrative example, report position gesture 1700 is an example of one implementation for report position gesture 420 in FIG. 4. Report position gesture 1700 is performed using touch screen 502.

Map 1702 is displayed on touch screen 502. Map 1702 is a moving map. Map 1702 is for airport 1704. Runway 1706, taxiway 1708, taxiway 1710, and aircraft icon 1712 are displayed on map 1702.

In this illustrative example, report position gesture 1700 is performed to identify a location at which the aircraft represented by aircraft icon 1712 is to report a position of the aircraft. As depicted, report position gesture 1700 is formed by placing finger 1714, finger 1716, and finger 1718 at location 1720 on taxiway 1708. The placement of finger 1714, finger 1716, and finger 1718 includes pressing down these fingers at location 1720 in this illustrative example.

Figure 18:
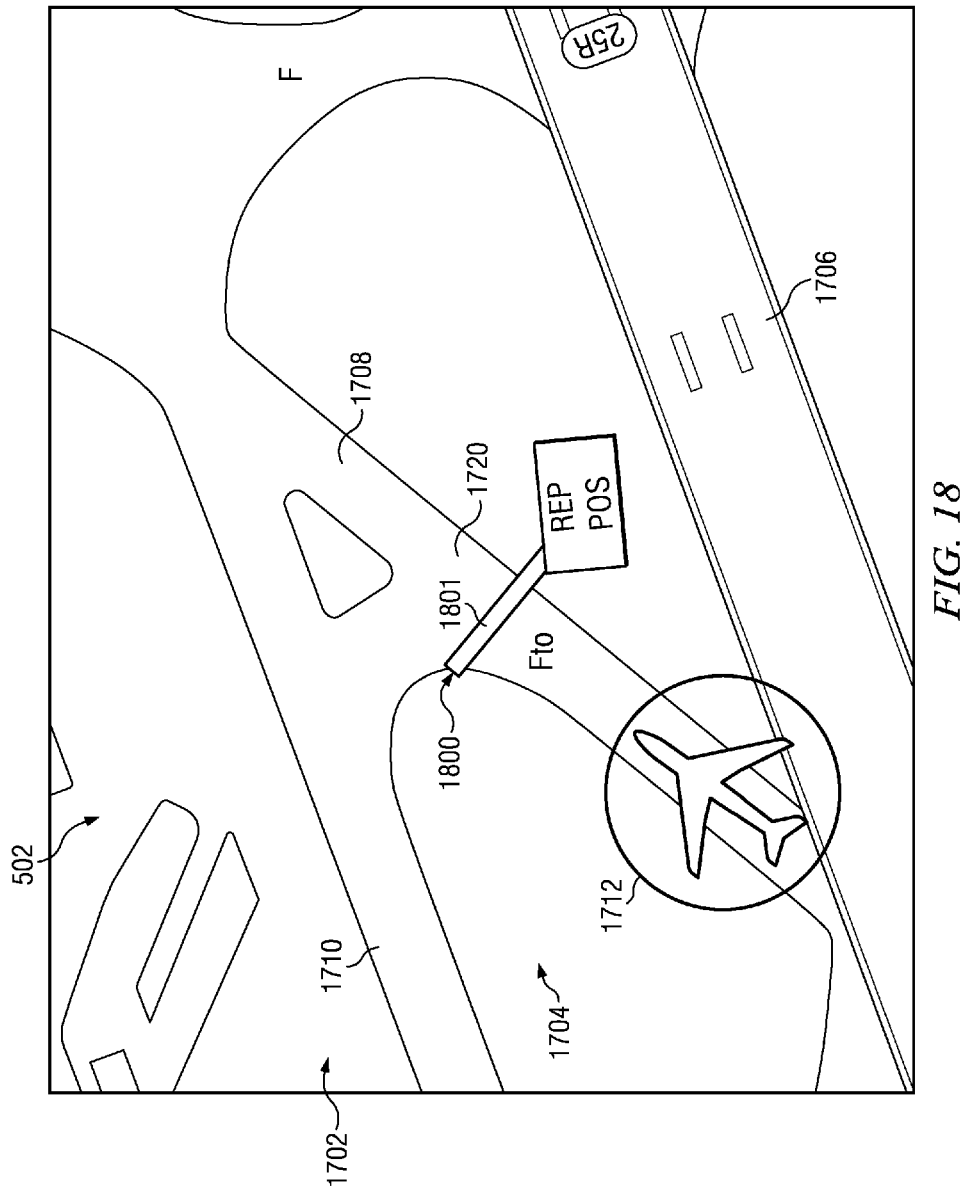
FIG. 18 is an illustration of a result of a report position gesture in accordance with an advantageous embodiment.

With reference now to FIG. 18, an illustration of a result of a report position gesture is depicted in accordance with an advantageous embodiment. In this illustrative example, marker 1800 is displayed on map 1702 in response to detecting report position gesture 1700 in FIG. 17.

In this depicted example, marker 1800 takes the form of line 1801. In other advantageous embodiments, marker 1800 may take the form a graphical indicator, an icon, a symbol, or some other suitable type of marker.

Line 1801 is displayed at location 1720. Line 1801 indicates that the aircraft identified by aircraft icon 1712 is to report the position of the aircraft when location 1720 on taxiway 1708 is reached.

Figure 19:
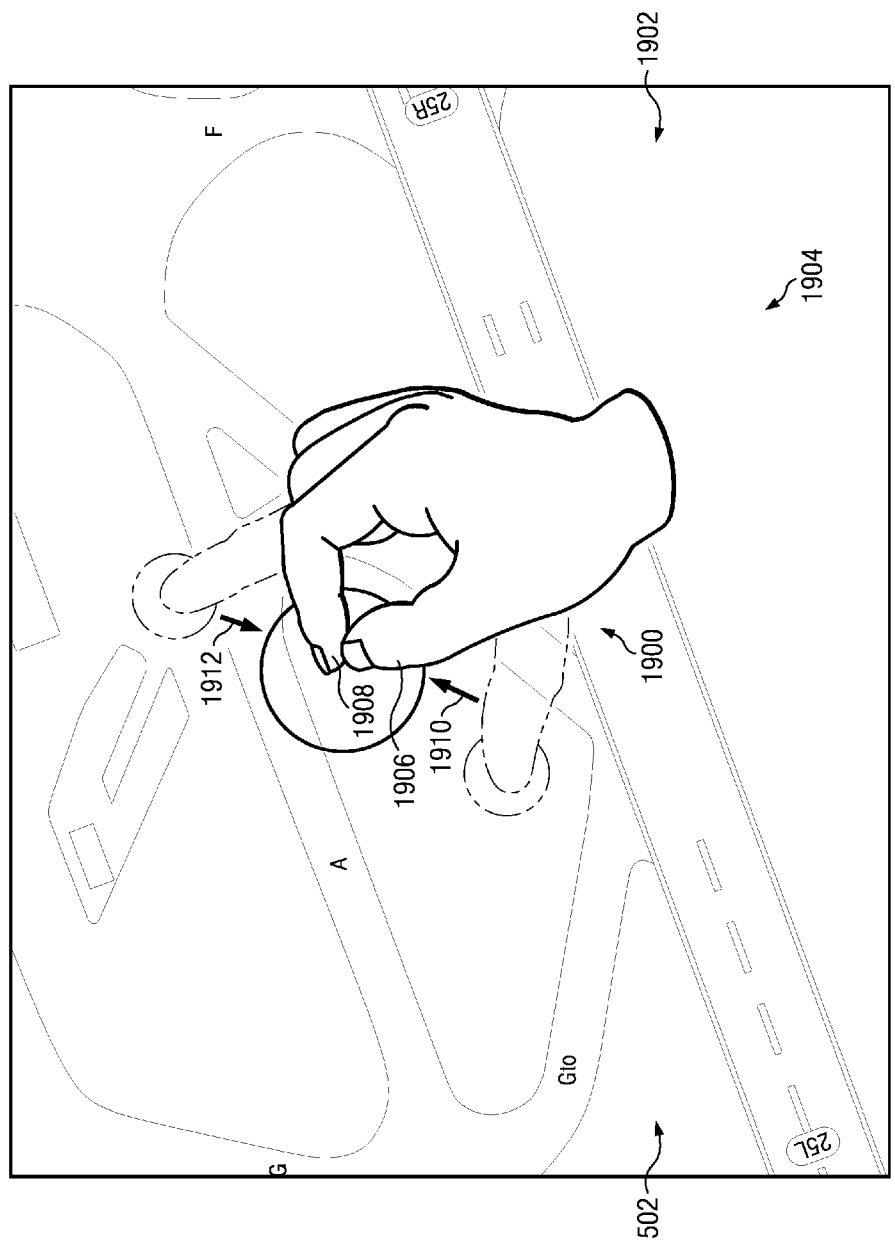
FIG. 19 is an illustration of a zoom gesture in accordance with an advantageous embodiment.

With reference now to FIG. 19, an illustration of a zoom gesture is depicted in accordance with an advantageous embodiment. In this illustrative example, zoom gesture 1900 is an example of one implementation for zoom gesture 422 in FIG. 4. Zoom gesture 1900 is performed using touch screen 502.

Map 1902 is displayed on touch screen 502. Map 1902 is a moving map. Map 1902 is for airport 1904. In this illustrative example, zoom gesture 1900 is performed to zoom out of map 1902.

As depicted in this example, zoom gesture 1900 is formed by placing finger 1906 and finger 1908 away from each other on map 1902 and moving finger 1906 and finger 1908 towards each other on map 1902. Finger 1906 is moved in the direction of arrow 1910 on map 1902 towards finger 1908. Finger 1908 is moved in the direction of arrow 1912 on map 1902 towards finger 1906.

In other advantageous embodiments, zoom gesture 1900 may be performed to zoom into map 1902. In these embodiments, finger 1906 and finger 1908 are placed next to each other on map 1902 and then moved away from each other on map 1902.

Figure 20:
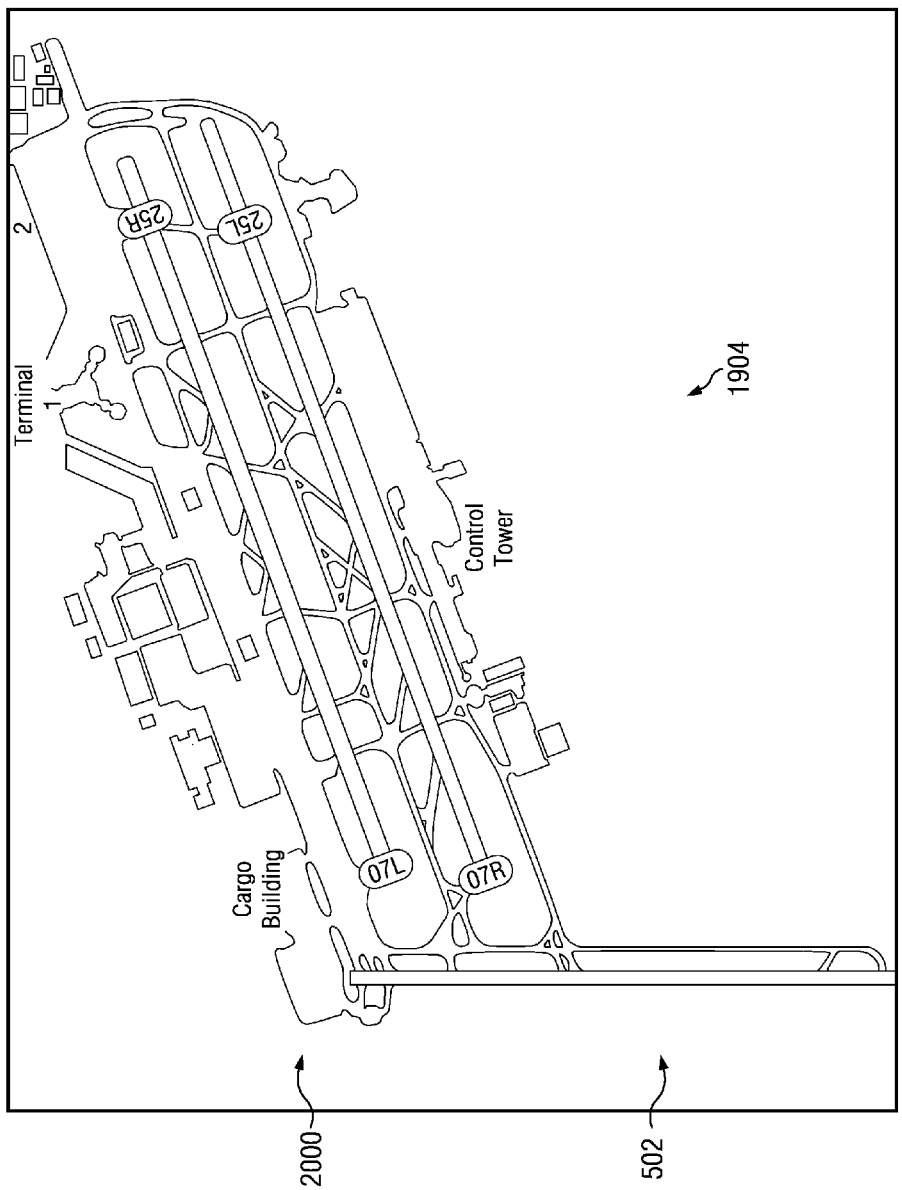
FIG. 20 is an illustration of a result of a zoom gesture in accordance with an advantageous embodiment.

With reference now to FIG. 20, an illustration of a result of a zoom gesture is depicted in accordance with an advantageous embodiment. In this illustrative example, map 2000 is displayed in response to detecting zoom gesture 1900 in FIG. 19. Map 2000 is a zoomed out view of airport 1904.

Figure 21:
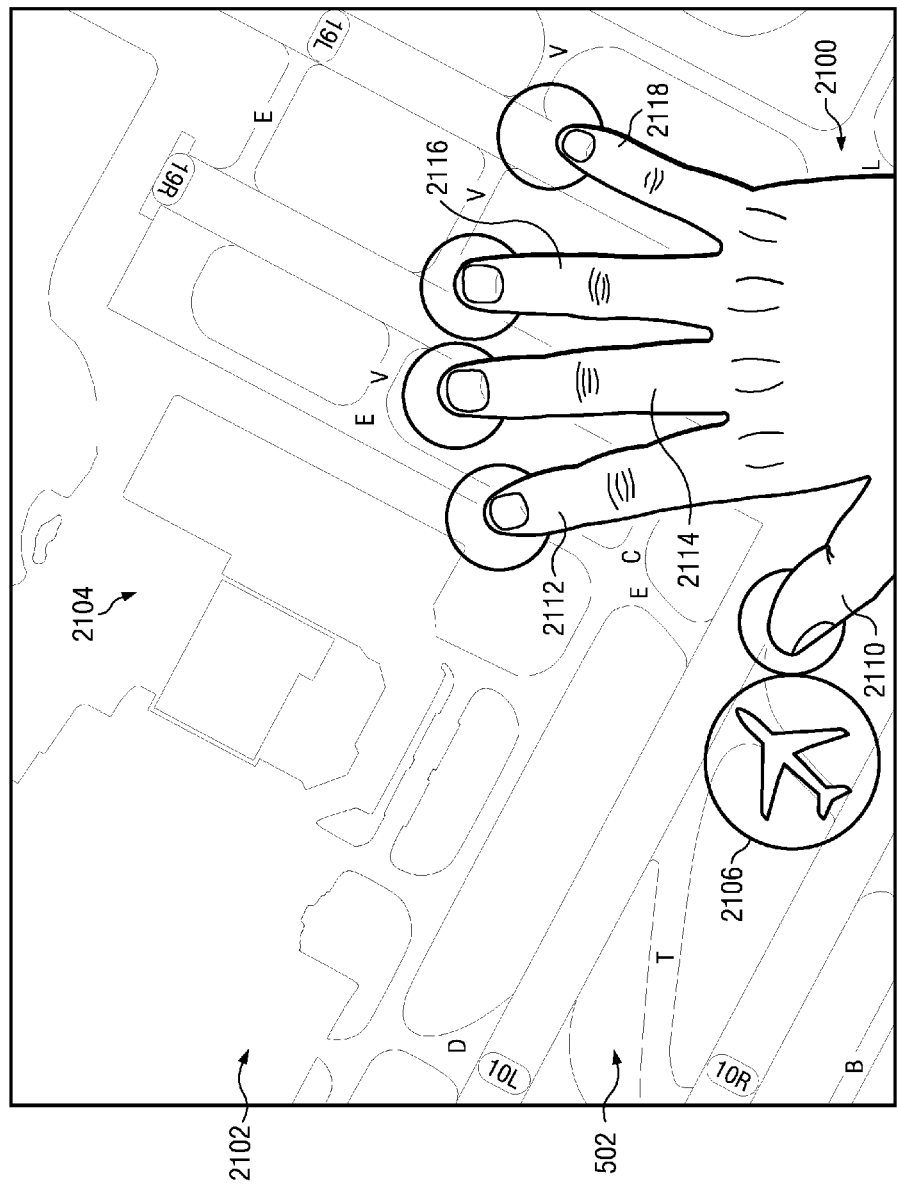
FIG. 21 is an illustration of a center on ownship gesture in accordance with an advantageous embodiment.

With reference now to FIG. 21, an illustration of a center on ownship gesture is depicted in accordance with an advantageous embodiment. In this illustrative example, center on ownship gesture 2100 is an example of one implementation for center on ownship gesture 424 in FIG. 4. Center on ownship gesture 2100 is performed using touch screen 502.

Map 2102 is displayed on touch screen 502. Map 2102 is a moving map. Map 2102 is for airport 2104. Aircraft icon 2106 is displayed on map 2102. Aircraft icon 2106 represents an aircraft located at airport 2104.

In this illustrative example, center on ownship gesture 2100 is formed by placing fingers 2110, 2112, 2114, 2116, and 2118 on map 2102 at any location on map 2102. In this depicted example, fingers 2110, 2112, 2114, 2116, and 2118 are simultaneously placed on map 2102. The placement of fingers 2110, 2112, 2114, 2116, and 2118 on map 2102 includes pressing down fingers 2110, 2112, 2114, 2116, and 2118 on map 2102.

Figure 22:
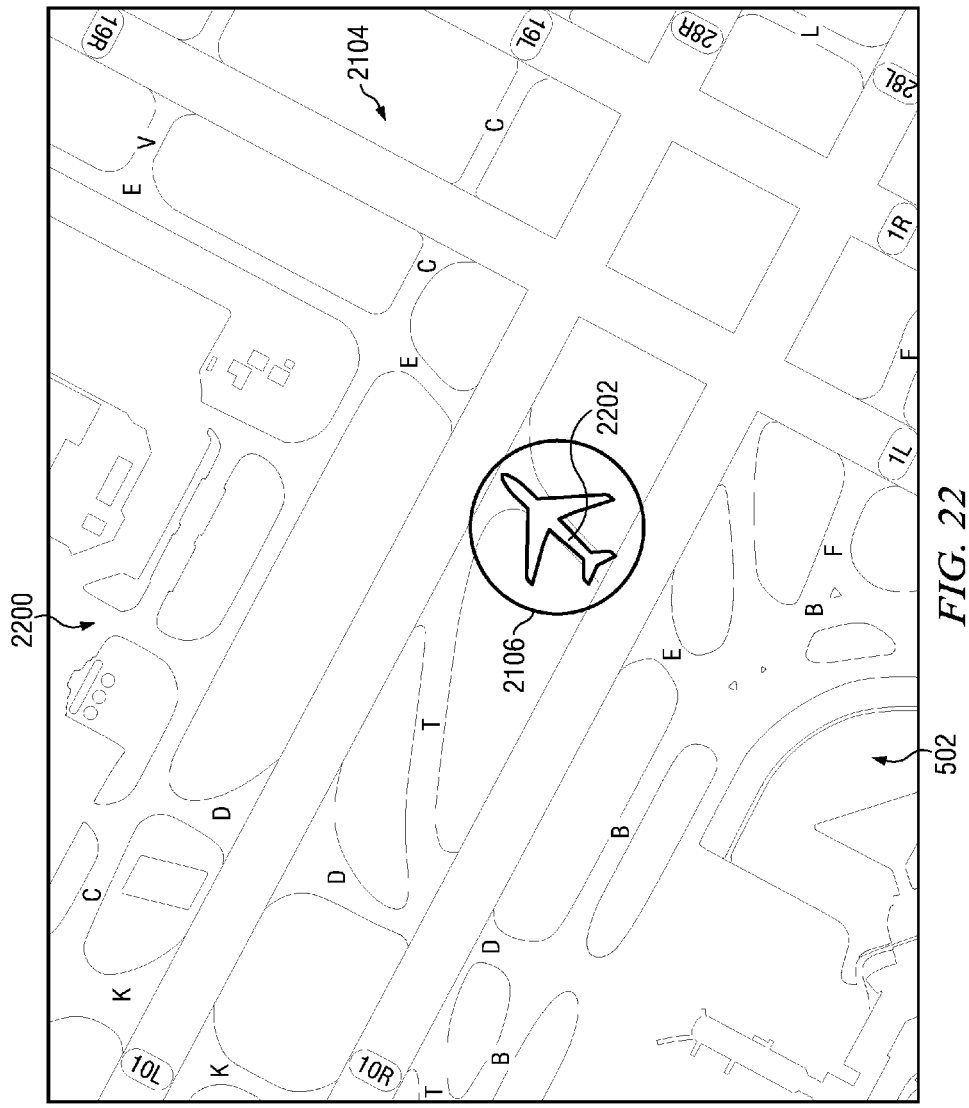
FIG. 22 is an illustration of a result of a center on ownship gesture in accordance with an advantageous embodiment.

With reference now to FIG. 22, an illustration of a result of a center on ownship gesture is depicted in accordance with an advantageous embodiment. In this illustrative example, centered map 2200 is displayed on touch screen 502 in response to detecting center on ownship gesture 2100 in FIG. 21. Centered map 2200 is centered with respect to aircraft icon 2106. In other words, map 2102 in FIG. 21 is changed such that aircraft icon 2106 is displayed at center location 2202 of centered map 2200.

Figure 23:
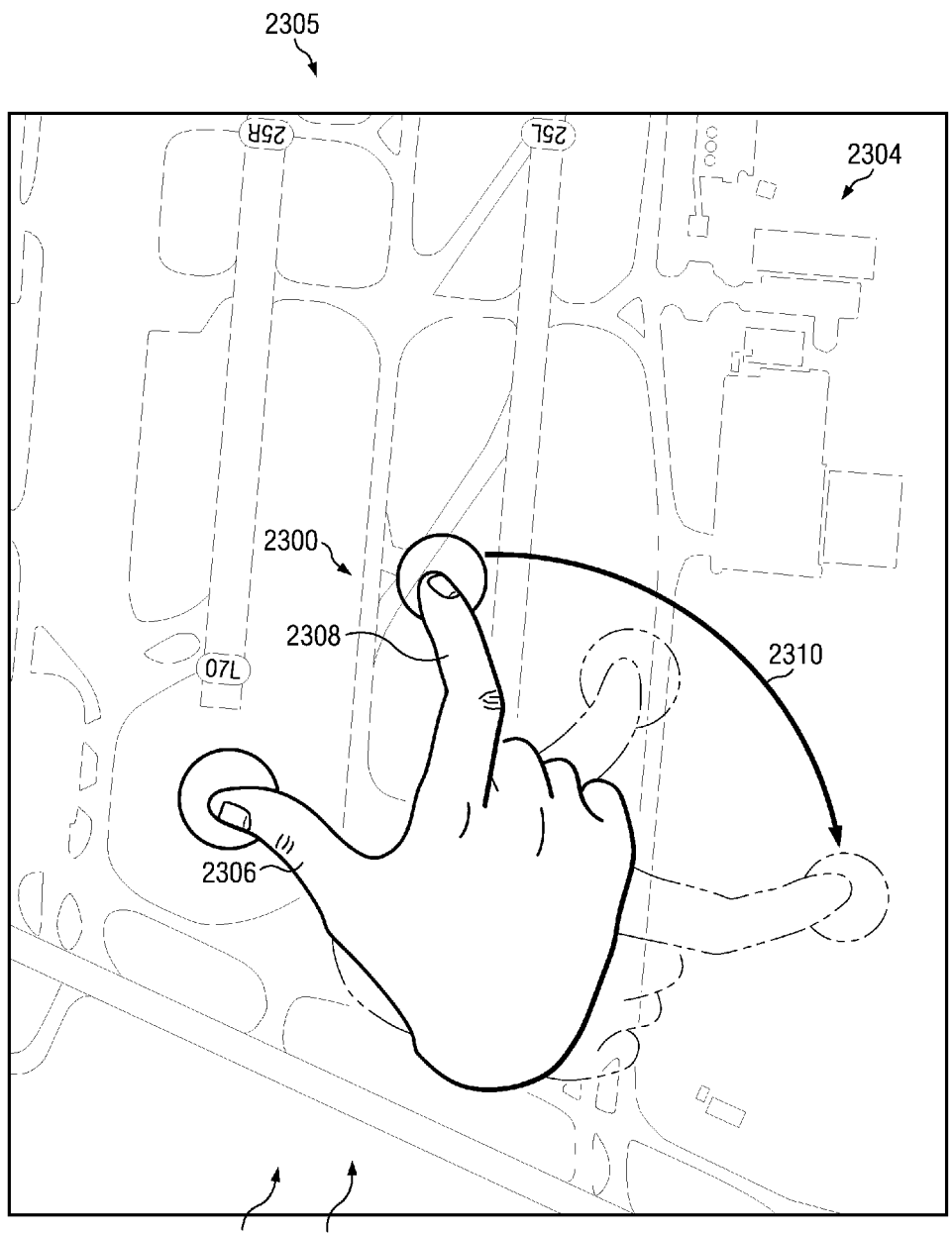
FIG. 23 is an illustration of a rotate map gesture in accordance with an advantageous embodiment.

With reference now to FIG. 23, an illustration of a rotate map gesture is depicted in accordance with an advantageous embodiment. In this illustrative example, rotate map gesture 2300 is an example of one implementation for rotate map gesture 426 in FIG. 4. Rotate map gesture 2300 is performed using touch screen 502.

Map 2302 is displayed on touch screen 502. Map 2302 is a moving map. Map 2302 is for airport 2304. In this depicted example, map 2302 has orientation 2305. Rotate map gesture 2300 is performed, in this illustrative example, to rotate map 2302 on touch screen 502 from orientation 2305 to a desired orientation.

In this illustrative example, rotate map gesture 2300 is formed by placing finger 2306 and finger 2308 on map 2302 and sliding and rotating finger 2306 and finger 2308 on map 2302. Finger 2306 and finger 2308 slide and rotate in the direction of arrow 2310. The placement of finger 2306 and finger 2308 on map 2302 includes pressing down finger 2306 and finger 2308 on map 2302.

As finger 2306 and finger 2308 slide and rotate on map 2302, map 2302 may also rotate. Finger 2306 and finger 2308 slide and rotate on map 2302 until a desired orientation for map 2302 is achieved.

Figure 24:
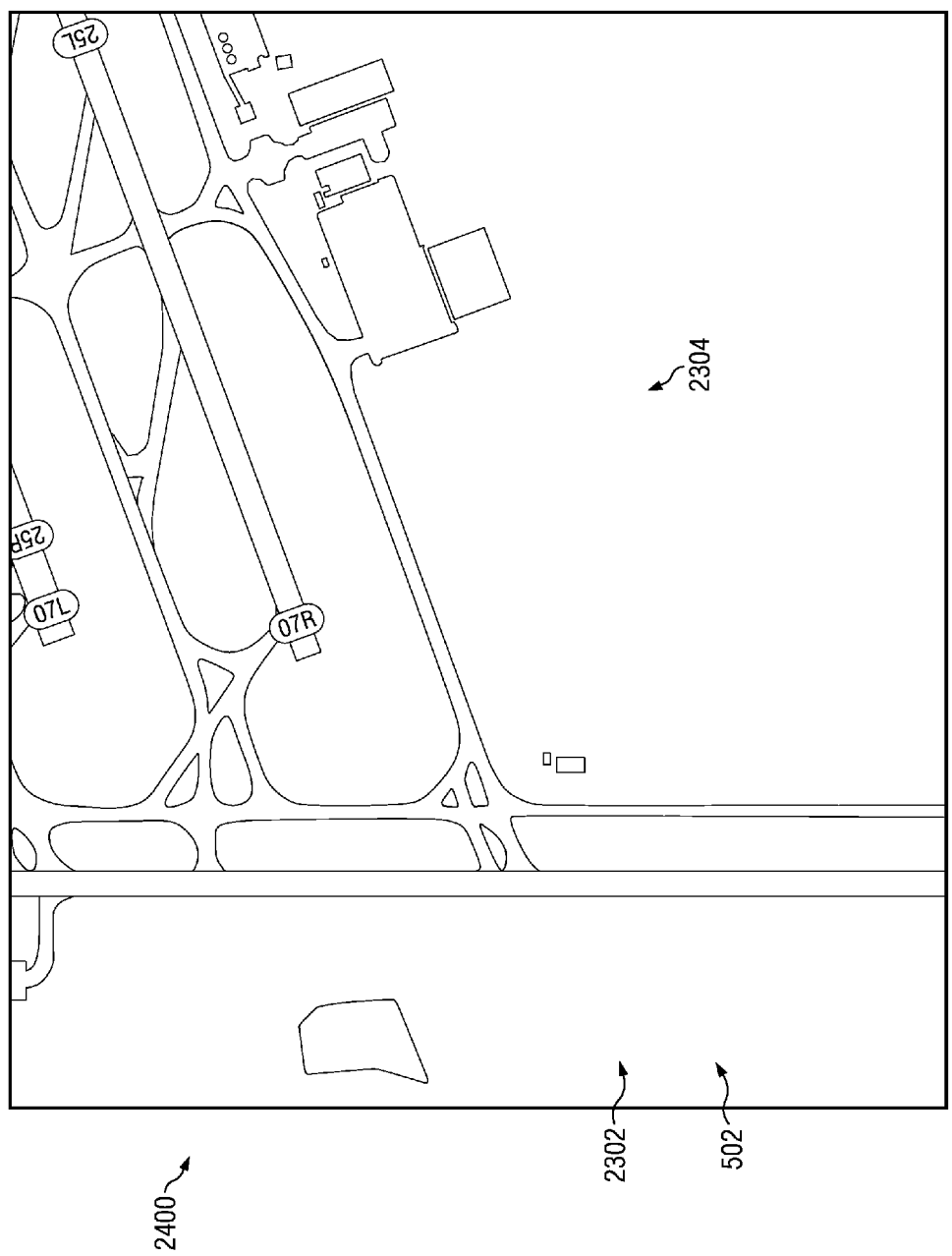
FIG. 24 is an illustration of a result of a rotate map gesture in accordance with an advantageous embodiment.

With reference now to FIG. 24, an illustration of a result of a rotate map gesture is depicted in accordance with an advantageous embodiment. In this illustrative example, map 2302 is displayed in desired orientation 2400 in response to detecting rotate map gesture 2300 in FIG. 23. As depicted in this example, desired orientation 2400 is about 90 degrees rotated clockwise from orientation 2305 in FIG. 23.

Figure 25:
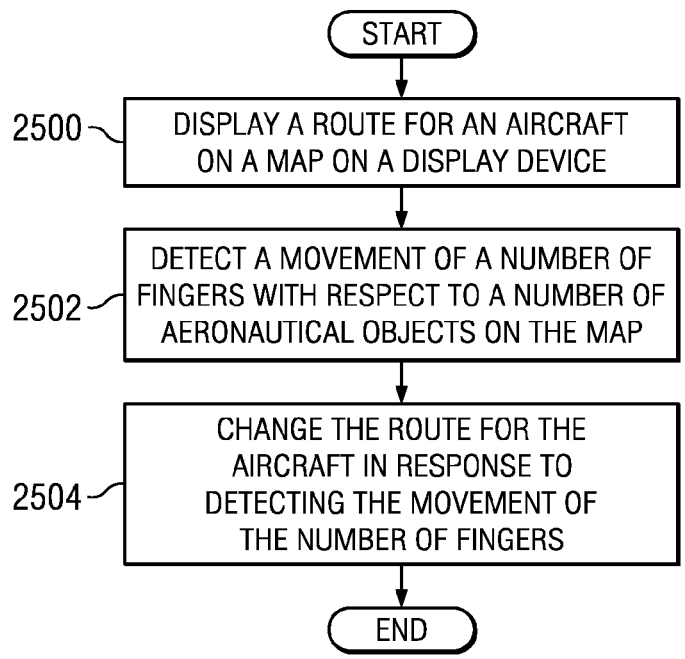
FIG. 25 is an illustration of a flowchart of a process for managing a route for an aircraft in accordance with an advantageous embodiment.

With reference now to FIG. 25, an illustration of a flowchart of a process for managing a route for an aircraft is depicted in accordance with an advantageous embodiment. The process illustrated in FIG. 25 may be implemented using map application 314 in aircraft information environment 300 in FIG. 3.

The process begins by displaying a route for an aircraft on a map on a display device (operation 2500). The process then detects a movement of a number of fingers with respect to a number of aeronautical objects on the map (operation 2502). In operation 2502, this movement is detected by an input device. The input device may be, for example, a touch screen.

The movement of the number of fingers detected may take many forms. For example, the movement may include at least one of a placement of the number of fingers with respect to the number of aeronautical objects, a movement of the number of fingers to a number of positions with respect to the number of aeronautical objects, and other suitable types of movements. The movement of the number of fingers with respect to the number of aeronautical objects forms a gesture.

Thereafter, the process changes the route for the aircraft in response to detecting the movement of the number of fingers (operation 2504), with the process terminating thereafter. In these illustrative examples, changes to the route may be displayed on the display device.

Figure 26:
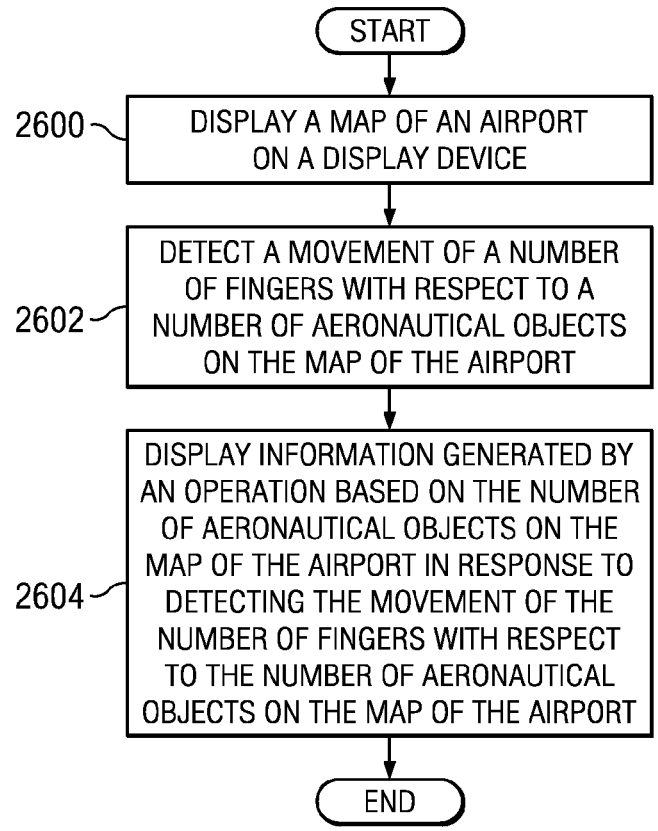
FIG. 26 is an illustration of a flowchart of a process for managing a map of an airport in accordance with an advantageous embodiment.

With reference now to FIG. 26, an illustration of a flowchart of a process for managing a map of an airport is depicted in accordance with an advantageous embodiment. The process illustrated in FIG. 26 may be implemented using map application 314 in aircraft information environment 300 in FIG. 3.

The process begins by displaying a map of an airport on a display device (operation 2600). This map may be implemented using, for example, without limitation, map 318 in FIG. 3. The process then detects a movement of a number of fingers with respect to a number of aeronautical objects on the map of the airport (operation 2602). This movement of the number of fingers forms a gesture.

Thereafter, the process displays information generated by an operation based on the number of aeronautical objects on the map of the airport in response to detecting the movement of the number of fingers with respect to the number of aeronautical objects on the map of the airport (operation 2604), with the process terminating thereafter. In these illustrative examples, the information displayed may be, for example, changes to a path of an aircraft, changes to the map of the airport, lines indicating locations at the airport, and/or other suitable types of information.

Figure 27:
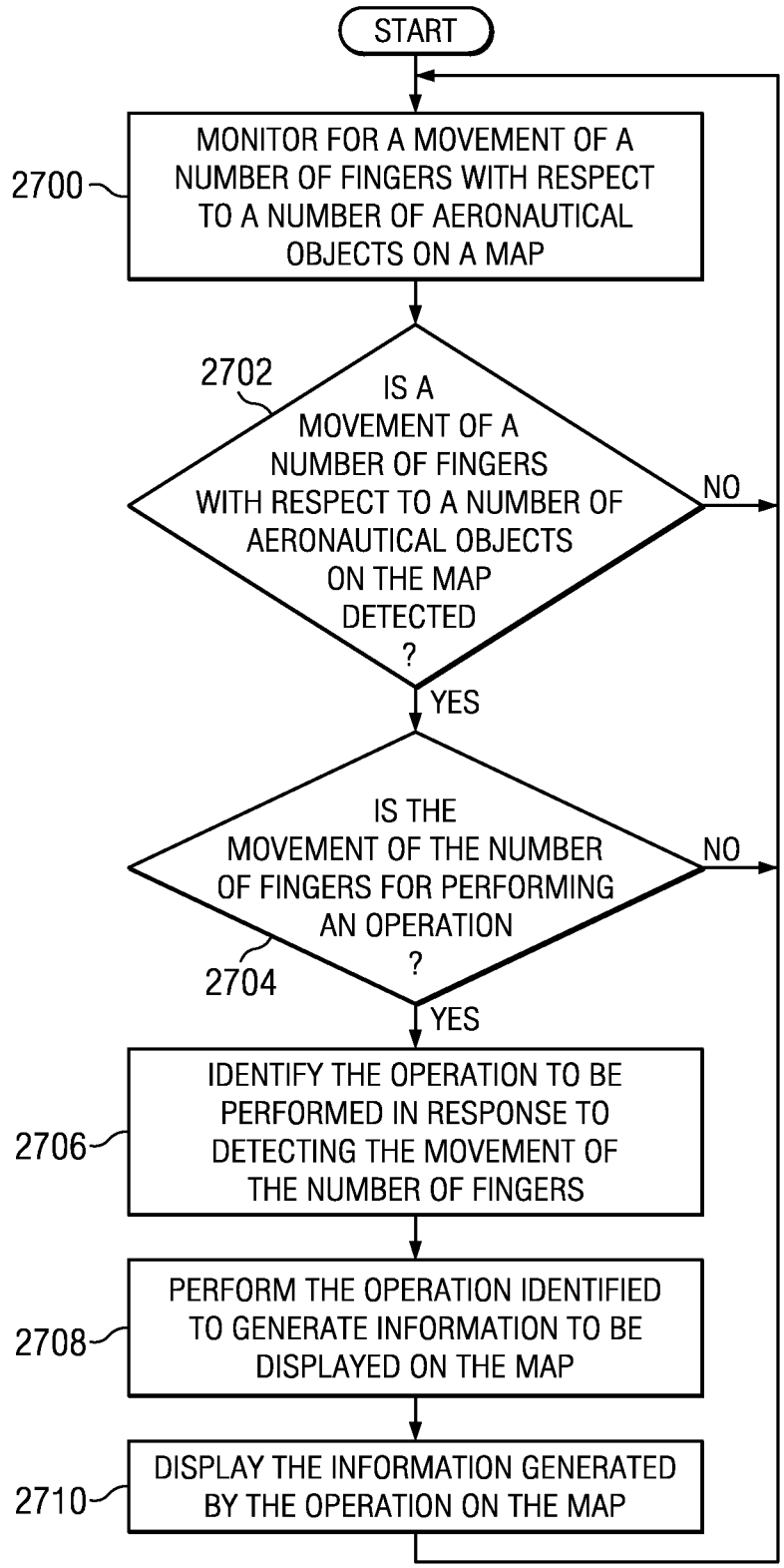
FIG. 27 is an illustration of a flowchart of a process for managing a map in accordance with an advantageous embodiment.

With reference now to FIG. 27, an illustration of a flowchart of a process for managing a map is depicted in accordance with an advantageous embodiment. The process illustrated in FIG. 7 may be implemented using map application 314 in aircraft information environment 300 in FIG. 3.

The process begins by monitoring for a movement of a number of fingers with respect to a number of aeronautical objects on a map (operation 2700). The number of aeronautical objects may include, for example, without limitation, a movement area, a runway, a taxiway, a tower, a route displayed on the map, a waypoint displayed on the map, an aircraft, a terminal, or some other object.

The process determines whether a movement of a number of fingers with respect to a number of aeronautical objects on the map is detected (operation 2702). If a movement of a number of fingers with respect to a number of aeronautical objects on the map is not detected, the process returns to operation 2700.

Otherwise, if a movement of a number of fingers with respect to a number of aeronautical objects on the map is detected, the process determines whether the movement of the number of fingers is for performing an operation (operation 2704). In other words, the process determines whether the movement of the number of fingers forms a gesture for an operation. The operation may include, for example, without limitation, performing calculations for routes, making changes to the map, and/or other suitable types of operations.

If the movement of the number of fingers is not for performing an operation, the process returns to operation 1700 as described above. Otherwise, if the movement of the number of fingers is for performing an operation, the process identifies the operation to be performed in response to detecting the movement of the number of fingers (operation 2706). The process performs the operation identified to generate information to be displayed on the map (operation 2708). This information may include, for example, without limitation, changes to a route, changes to the map, an identification of an object displayed on the map, an identification of a position, an addition of an object to the map, and other suitable information.

The process displays the information generated by the operation on the map (operation 2710), with the process then returning to operation 2700. The information displayed on the map is used by a pilot or other operator to operate an aircraft.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

In some advantageous embodiments, operation 2710 in FIG. 27 may not be performed immediately after performing operation 2708. For example, the process may return to operation 2700 to monitor for additional movements of the number of fingers before displaying the information generated in operation 2708 on the map. In other words, a number of operations for operation 2708 may be performed before displaying the information generated by this number of operations on the map.

Thus, the different advantageous embodiments provide a method and apparatus for interacting with a map application. In one advantageous embodiment, a method and apparatus is present for managing the route of an aircraft during flight. A route is displayed on a map on a display device. A movement of a number of fingers with respect to a number of aeronautical objects on the map is detected. The route of the aircraft is changed in response to detecting the movement of the number of fingers.

In another advantageous embodiment, a map of an airport is displayed on the display device. Movement of the number of fingers is detected with respect to a number of aeronautical objects on the map of the airport. Information is displayed in response to detecting the movement of the number of fingers with respect to the number of aeronautical objects on the map of the airport.

The different advantageous embodiments allow for a pilot or other operator of an aircraft to more easily interact with a map application to operate the aircraft. The different advantageous embodiments may reduce the time and/or effort needed to enter information into the map application and view the information on a map.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, to keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. For example, although the different advantageous embodiments are described with respect to a vehicle in the form of an aircraft, other advantageous embodiments may be applied to other types of vehicles. For example, without limitation, vertical situation information may be presented for a spacecraft, a submarine, or some other type of aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a map of an airport, the method comprising:

displaying the map of the airport on a display device;

detecting a movement of a number of fingers with respect to a number of aeronautical objects on the map of the airport, wherein the step of detecting the movement of the number of fingers with respect to the number of aeronautical objects on the map of the airport comprises: detecting at least one of a placement of the number of fingers with respect to the number of aeronautical objects on the map and a movement of the number of fingers to a number of positions with respect to the number of aeronautical objects on the map; wherein detecting the hold short gesture causes a mark to be displayed at a point on a runway on the map that an aircraft cannot pass; wherein detecting the missed approach gesture causes a new route for the aircraft to be displayed on the map; wherein detecting the parallel runway gesture causes an alternate runway to be highlighted on the map; wherein detecting the report position gesture causes a marker to be placed on the runway at a point that the aircraft must report its position; and wherein detecting the back track gesture causes a path to be displayed on the map for the aircraft to turn around on the runway; and displaying information generated by an operation based on the number of aeronautical objects on the map of the airport in response to detecting the movement of the number of fingers with respect to the number of aeronautical objects on the map of the airport;

wherein the number of fingers is at least two fingers; and wherein the movement of the number of fingers is a gesture selected from a list consisting of a hold short gesture, a missed approach gesture, a parallel runway gesture, a back track gesture, and a report position gesture.

2. The method of claim 1, wherein the step of detecting the movement of the number of fingers with respect to the number of aeronautical objects on the map of the airport comprises:

detecting the hold short gesture, wherein the hold short gesture comprises a first finger in the number of fingers at a first location on one side of a movement area and a second finger in the number of fingers at a second location on a second side of the movement area; and wherein the step of displaying the information generated by the operation based on the number of aeronautical objects on the map of the airport in response to detecting the movement of the number of fingers with respect to the number of aeronautical objects on the map of the airport comprises:

displaying a marker between the first location and the second location on the map, wherein the marker defines a hold short position for an aircraft.

3. The method of claim 1, wherein the step of detecting the movement of the number of fingers with respect to the number of aeronautical objects on the map of the airport comprises:

detecting the missed approach gesture, wherein the missed approach gesture comprises a finger in the number of fingers moving along a first line on the map; and detecting the finger moving along a second line on the map, wherein the first line and the second line cross each other; and wherein the step of displaying the information generated by the operation based on the number of aeronautical objects on the map of the airport in response to detecting the movement of the number of fingers with respect to the number of aeronautical objects on the map of the airport comprises:

displaying the information for a missed approach for an aircraft in response to detecting the finger moving along the first line and the second line.

4. The method of claim 3, wherein the first line and the second line are on a runway for a landing of the aircraft.

5. The method of claim 1, wherein the step of detecting the movement of the number of fingers with respect to the number of aeronautical objects on the map of the airport comprises:

detecting the back track gesture, wherein the back track gesture comprises a placement of a first finger in the number of fingers on an aircraft icon located on a runway on the map; and detecting a placement of a second finger in the number of fingers on a location on the runway behind the aircraft icon on the map; and wherein the step of displaying the information generated by the operation based on the number of aeronautical objects on the map of the airport in response to detecting the movement of the number of fingers with respect to the number of aeronautical objects on the map of the airport comprises:

displaying a path for the aircraft to turn around on the runway.

6. The method of claim 1, wherein the step of detecting the movement of the number of fingers with respect to the number of aeronautical objects on the map of the airport comprises:

detecting the parallel runway gesture, wherein the parallel runway gesture comprises a placement of the number of fingers on a first runway on the map, wherein the first runway is assigned for landing of an aircraft; and detecting a movement of the number of fingers from the first runway to a second runway; and wherein the step of displaying the information generated by the operation based on the number of aeronautical objects on the map of the airport in response to detecting the movement of the number of fingers with respect to the number of aeronautical objects on the map of the airport comprises:

displaying a change of an assignment of the first runway for the landing of the aircraft to the second runway for the landing of the aircraft.

7. The method of claim 1, wherein the step of detecting the movement of the number of fingers with respect to the number of aeronautical objects on the map of the airport comprises:

detecting the report position gesture, wherein the report position gesture comprises a placement of a plurality of fingers in the number of fingers on a location on the map; and wherein the step of displaying the information generated by the operation based on the number of aeronautical objects on the map of the airport in response to detecting the movement of the number of fingers with respect to the number of aeronautical objects on the map of the airport comprises:

displaying a marker at the location on the map where a position of an aircraft is to be reported.

8. The method of claim 1, wherein the number of aeronautical objects comprises at least one of a movement area, a runway, a taxiway, a route on the map, a waypoint on the map, an aircraft, an icon, a terminal, a location on a side of the runway, and a location on a side of the taxiway.

9. A computer system, the computer system comprising:
a display device;
a storage device;
program code stored on the storage device; and
a processor unit configured to run the program code to display a map of an airport on a screen of the display device; detect a movement of a number of fingers with respect to a number of aeronautical objects on the map of the airport, wherein in detecting the movement of the number of fingers with respect to the number of aeronautical objects on the map of the airport, the processor unit is configured to run the program code to detect at least one of a placement of the number of fingers with respect to the number of aeronautical objects on the map and a movement of the number of fingers to a number of positions with respect to the number of aeronautical objects on the map; wherein detecting the hold short gesture causes a mark to be displayed at a point on a runway on the map that an aircraft cannot pass; wherein detecting the missed approach gesture causes a new route for the aircraft to be displayed on the map; wherein detecting the parallel runway gesture causes an alternate runway to be highlighted on the map; wherein detecting the report position gesture causes a marker to be placed on the runway at a point that the aircraft must report its position; and wherein detecting the back track gesture causes a path to be displayed on the map for the aircraft to turn around on the runway; and display information generated by an operation based on the number of aeronautical objects on the map of the airport in response to detecting the movement of the number of fingers with respect to the number of aeronautical objects on the map of the airport;

wherein the number of fingers is at least two fingers;

wherein the movement of the number of fingers is a gesture selected from a list consisting of a hold short gesture, a missed approach gesture, a parallel runway gesture, a back track gesture, and a report position gesture.

10. The computer system of claim 9, wherein in detecting the movement of the number of fingers with respect to the number of aeronautical objects on the map of the airport, the processor unit is configured to run the program code to detect the hold short gesture, wherein the hold short gesture comprises a first finger in the number of fingers at a first location on one side of a movement area and a second finger in the number of fingers at a second location on a second side of the movement area; and wherein in displaying the information generated by the operation based on the number of aeronautical objects on the map of the airport in response to detecting the movement of the number of fingers with respect to the number of aeronautical objects on the map of the airport, the processor unit is configured to run the program code to display a marker between the first location and the second location on the map, wherein the marker defines a hold short position for an aircraft.

11. The computer system of claim 9, wherein in detecting the movement of the number of fingers with respect to the number of aeronautical objects on the map of the airport, the processor unit is configured to run the program code to detect the missed approach gesture, wherein the missed approach gesture comprises a finger in the number of fingers moving along a first line on the map and detect the finger moving along a second line on the map, wherein the first line and the second line cross each other; and wherein in displaying the information generated by the operation based on the number of aeronautical objects on the map of the airport in response to detecting the movement of the number of fingers with respect to the number of aeronautical objects on the map of the airport, the processor unit is configured to run the program code to display the information for a missed approach for an aircraft in response to detecting the finger moving along the first line and the second line.

12. The computer system of claim 11, wherein the first line and the second line are on a runway for a landing of the aircraft.

13. The computer system of claim 9, wherein in detecting the movement of the number of fingers with respect to the number of aeronautical objects on the map of the airport, the processor unit is configured to run the program code to detect the back track gesture, wherein the back track gesture comprises a placement of a first finger in the number of fingers on an aircraft icon located on a runway on the map and detect a placement of a second finger in the number of fingers on a location on the runway behind the aircraft icon on the map; and wherein in displaying the information generated by the operation based on the number of aeronautical objects on the map of the airport in response to detecting the movement of the number of fingers with respect to the number of aeronautical objects on the map of the airport, the processor unit is configured to run the program code to display a path for an aircraft to turn around on the runway.

14. The computer system of claim 9, wherein in detecting the movement of the number of fingers with respect to the number of aeronautical objects on the map of the airport, the processor unit is configured to run the program code to detect the parallel runway gesture, wherein the parallel runway gesture comprises a placement of the number of fingers on a first runway on the map, wherein the first runway is assigned for landing of an aircraft and detect a movement of the number of fingers from the first runway to a second runway; wherein in displaying the information generated by the operation based on the number of aeronautical objects on the map of the airport in response to detecting the movement of the number of fingers with respect to the number of aeronautical objects on the map of the airport, the processor unit is configured to run the program code to display a change of an assignment of the first runway for the landing of the aircraft to the second runway for the landing of the aircraft.

15. The computer system of claim 9, wherein in detecting the movement of the number of fingers with respect to the number of aeronautical objects on the map of the airport, the processor unit is configured to run the program code to detect the report position gesture, wherein the report position gesture comprises a placement of a plurality of fingers in the number of fingers on a location on the map; and wherein in displaying the information generated by the operation based on the number of aeronautical objects on the map of the airport in response to detecting the movement of the number of fingers with respect to the number of aeronautical objects on the map of the airport, the processor unit is configured to run the program code to display a marker at the location on the map where a position of the aircraft is to be reported.

16. The computer system of claim 9, wherein the number of aeronautical objects comprises at least one of a movement area, a runway, a taxiway, a route on the map, a waypoint on the map, an aircraft, an icon, a terminal, a location on a side of the runway, and a location on a side of the taxiway.

17. A non-transitory computer program product, the computer program product comprising: a computer recordable storage medium; program code, stored on the computer recordable storage medium, for displaying a map of an airport on a display device; program code, stored on the computer recordable storage medium, for detecting a movement of a number of fingers with respect to a number of aeronautical objects on the map of the airport, wherein the program code, stored on the computer recordable storage medium, for detecting the movement of the number of fingers with respect to the number of aeronautical objects on the map of the airport comprises: program code, stored on the computer recordable storage medium, for detecting at least one of a placement of the number of fingers with respect to the number of aeronautical objects on the map and the movement of the number of fingers to a number of positions with respect to the number of aeronautical objects on the map; wherein detecting the hold short gesture causes a mark to be displayed at a point on a runway on the map that an aircraft cannot pass; wherein detecting the missed approach gesture causes a new route for the aircraft to be displayed on the map; wherein detecting the parallel runway gesture causes an alternate runway to be highlighted on the map; wherein detecting the report position gestures causes a marker to be placed on the runway at a point that the aircraft must report its position; and wherein detecting the back track gesture causes a path to be displayed on the map for the aircraft to turn around on the runway; and program code, stored on the computer recordable storage medium, for displaying information generated by an operation based on the number of aeronautical objects on the map of the airport in response to detecting the movement of the number of fingers with respect to the number of aeronautical objects on the map of the airport; wherein the number of fingers is at least two fingers; wherein the movement of the number of fingers is a gesture selected from a list consisting of a hold short gesture, a missed approach gesture, a parallel runway gesture, a back track gesture, and a report position gesture.

* * * * *